(12) United States Patent
Itagaki et al.

(10) Patent No.: US 7,230,785 B2
(45) Date of Patent: Jun. 12, 2007

(54) DRIVE CONTROL DEVICE OF MOTOR AND DISK ROTATION SYSTEM

(75) Inventors: Kichiya Itagaki, Isesaki (JP); Hiroshi Sato, Takasaki (JP); Kenji Yoshida, Maebashi (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/210,755

(22) Filed: Aug. 25, 2005

(65) Prior Publication Data

US 2006/0044664 A1 Mar. 2, 2006

(30) Foreign Application Priority Data

Aug. 31, 2004 (JP) ............................. 2004-251748

(51) Int. Cl.
*G11B 15/46* (2006.01)
(52) U.S. Cl. ................................................. 360/73.03
(58) Field of Classification Search ...................... None
See application file for complete search history.

(56) References Cited

U.S. PATENT DOCUMENTS 5,466,997 A * 11/1995 Utenick et al. ............. 318/254
6,771,033 B2 * 8/2004 Kokami et al. ............. 318/138
2005/0036228 A1 * 2/2005 Kimura et al. ........... 360/73.03

FOREIGN PATENT DOCUMENTS

| JP | 09-502860 | 3/1997 |
| JP | 2000-295883 | 10/2000 |
| JP | 2003-111485 | 4/2003 |

* cited by examiner

Primary Examiner—K. Wong
(74) Attorney, Agent, or Firm—Mattingly, Stanger Malur & Brundidge PC

(57) ABSTRACT

A drive control device of a DC brushless multi-phase motor performs the speed control of the motor in place microprocessor, the burden on the microprocessor is relieved. The drive control device detects a zero crossing point of the back electromotive force in the non-energizing phase to perform the energizing switching to the coils by the PLL control, and includes a current detection circuit that detects currents flowing through the coils to perform the speed control of the motor based on the detected currents. The drive control device also, compares outputs from speed error detection circuit with outputs from the current detection circuit to determine the currents to be made to flow through the coils, and thereby controls the current output circuit.

10 Claims, 14 Drawing Sheets

CASE OF P = 12

CASE OF P = 8

CASE OF P = 6

DRIVE CONTROL DEVICE OF MOTOR AND DISK ROTATION SYSTEM

CROSS REFERENCE TO RELATED APPLICATION

The present application claims priority from Japanese patent application No. 2004-251748 filed on Aug. 31, 2004, the contents of which is hereby incorporated by reference into this application.

BACKGROUND OF THE INVENTION

The present invention relates to a drive control system of a brushless motor and a technique effective in use for the speed control of the motor. As an example, it relates to a technique effective in application to a semiconductor integrated circuit for driving and controlling a spindle motor that drives to rotate a disk storage medium such as a magnetic disk of a hard disk drive, and a motor drive control device using the integrated circuit.

The hard disk drive generally uses a DC brushless multi-phase motor as the so-called spindle motor. The hard disk drive rotates a magnetic disk at a high speed by means of the spindle motor, brings a read/write magnetic head close to the surface of the rotating magnetic disk, and writes or reads information while moving it in the radial direction. The invention concerning the drive control device of the spindle motor in a hard disk drive is disclosed, for example, in the Japanese Unexamined Patent Publication No. 2003-111485 (here under, referred to as Patent Document 1).

SUMMARY OF THE INVENTION

The motor drive control system disclosed in the Patent Document 1 detects the zero-closing point of a back electromotive force in the non-energizing phase to thereby detect the position of the rotor, and switches the energizing to the stator coil by the phase-locked loop (PLL). Further, the system detects a current from a voltage across a resistor for detecting a current flowing through the coil, and controls the current so that it becomes equal to a current command value SPNCRNT supplied from an external microprocessor (MPU). And the system transmits a signal (PHASE) representing the speed of rotation to the MPU; the MPU recognizes the speed of rotation of the motor from this signal, determines the current command value SPNCRNT so as to attain the predetermined rotational speed, and supplies the value to the motor drive control device. In short, the MPU performs the speed control of the motor in this system.

The hard disk drive has accepted increasing demands for performing high-speed accesses in writing/reading of information to a magnetic disk. To satisfy the above demands, efforts have been poured into the speeding-up of disk rotation, rotation of the spindle motor. However, in the system that a microprocessor performs the speed control of the spindle motor, the speeding-up involves an increasing burden on the microprocessor. On the other hand, there have been increasing demands for down-sizing the hard disk drive, and the hard disk drive of a small diameter, 2.5 inch, has been put into practical use.

The hard disk drive of such a small diameter is likely to generate the irregularities of rotation, because the inertia of the disk becomes lower and the traveling of a magnetic head is likely to vary the load on the spindle motor. Accordingly, the speed control to suppress the irregularities of rotation becomes necessary for the hard disk drive. Further, the microprocessor performs the control of a voice coil motor, in addition to the speed control of the spindle motor. Therefore, it is expected to relieve the burden on the microprocessor by leaving the speed control of the spindle motor to a motor drive control device (control LSI).

An object of the present invention is to provide a drive control device of a DC brushless multi-phase motor that can perform the speed control of the motor in replacement for the microprocessor, whereby the burden on the microprocessor is relieved.

Another object of the present invention is to provide a drive control device of a DC brushless multi-phase motor that can reduce the irregularities of rotation of the motor.

Another object of the present invention is to provide a drive control device of a DC brushless multi-phase motor that can shorten a time required until the motor reaches a steady rotation without an increase of the burden on the microprocessor.

Another object of the present invention is to provide a recording device for a magnetic recording disk that can suppress the irregularities of rotation of the spindle motor to rotate the magnetic recording disk, which facilitates down-sizing and high-density recording.

The foregoing and other objects of the invention and the features thereof will become apparent from the descriptions and the appended drawings of this specification.

Summaries of representative ones of the inventions disclosed in the present application will be explained in brief as follows:

According to one aspect of the invention, the drive control device detects a zero crossing point of the back electromotive force in the non-energizing phase to perform the energizing switching to the coils by the PLL control, and includes a current detection circuit that detects currents flowing through the coils to perform the speed control of the motor based on the detected currents. The device also includes a speed error detection circuit that compares a rotational speed extracted from the rotational speed information supplied from the PLL loop that controls the energizing switching with a target rotational speed supplied from the outside, compares outputs from the speed error detection circuit with outputs from the current detection circuit to determine the currents to make them flow through the coils, and thereby controls the current output circuit.

According to the above construction, the microprocessor only needs to supply the target rotational speed of the motor, and it does not need to supply the current command values in real time. Thus, the burden on the microprocessor is relieved.

According to another aspect of the invention, the drive control device adds by a predetermined number the outputs relating to the rotational speeds by the electrical angle 360° taken out from the PLL loop that controls the energizing switching to thereby attain the rotational speed information corresponding to the mechanical angle 360°. The device compares the rotational speed information and the target speed, determines the currents to be made to flow through the coils based on the detected speed error, and controls the current output circuit based on the currents determined. Thus, the rotational irregularities of the motor depending on the individual differences are reduced.

According to another aspect of the invention, the drive control device retains the outputs relating to the rotational speeds by the electrical angle 360° taken out from the PLL loop that controls the energizing switching, for the rotational speeds corresponding to the mechanical angle 360°, and calculates the rotational speed information corresponding to the mechanical angle 360° each by the electrical angle 360°. And, the device compares the rotational speed information with the target speed, determines the currents to be made to flow through the coils based on the detected speed error, and controls the current output circuit based on the currents determined. Thus, the rotational irregularities of the motor due to the variations of load are reduced.

According to another aspect of the invention, the drive control device performs the initial acceleration by the switching control of the energizing phase based on the detection of the magnetic pole positions of the rotor, with the control loop opened for the speed control. The device performs the acceleration in the range of some % to about 90% of the target rotational speed by the PLL control that brings the zero crossing point of the back electromotive force and the zero point of the output current into coincidence. In regard to the acceleration over 90% of the target speed, the device performs the phase control to put the phase of the coil drive voltage in lead by a predetermined phase against the phase of the back electromotive force based on the back electromotive force of the coil, and the speed control based on the output from the speed error detection circuit and the output from the current output circuit. Thus, the time required until the motor reaches the steady rotational speed is shortened without an increase of the burden on the microprocessor.

Thus, according to this invention, the speed control of the motor can be performed in replacement for the microprocessor.

BRIEF DESCRIPTION OF THE DRAWINGS

FIG. 1 is a block diagram illustrating one embodiment of a drive control circuit of a three-phase brushless motor, which the present invention is applied to;

DETAILED DESCRIPTION OF THE PREFERRED EMBODIMENTS

The preferred embodiments will be described with reference to the accompanying drawings.

Figure 1:
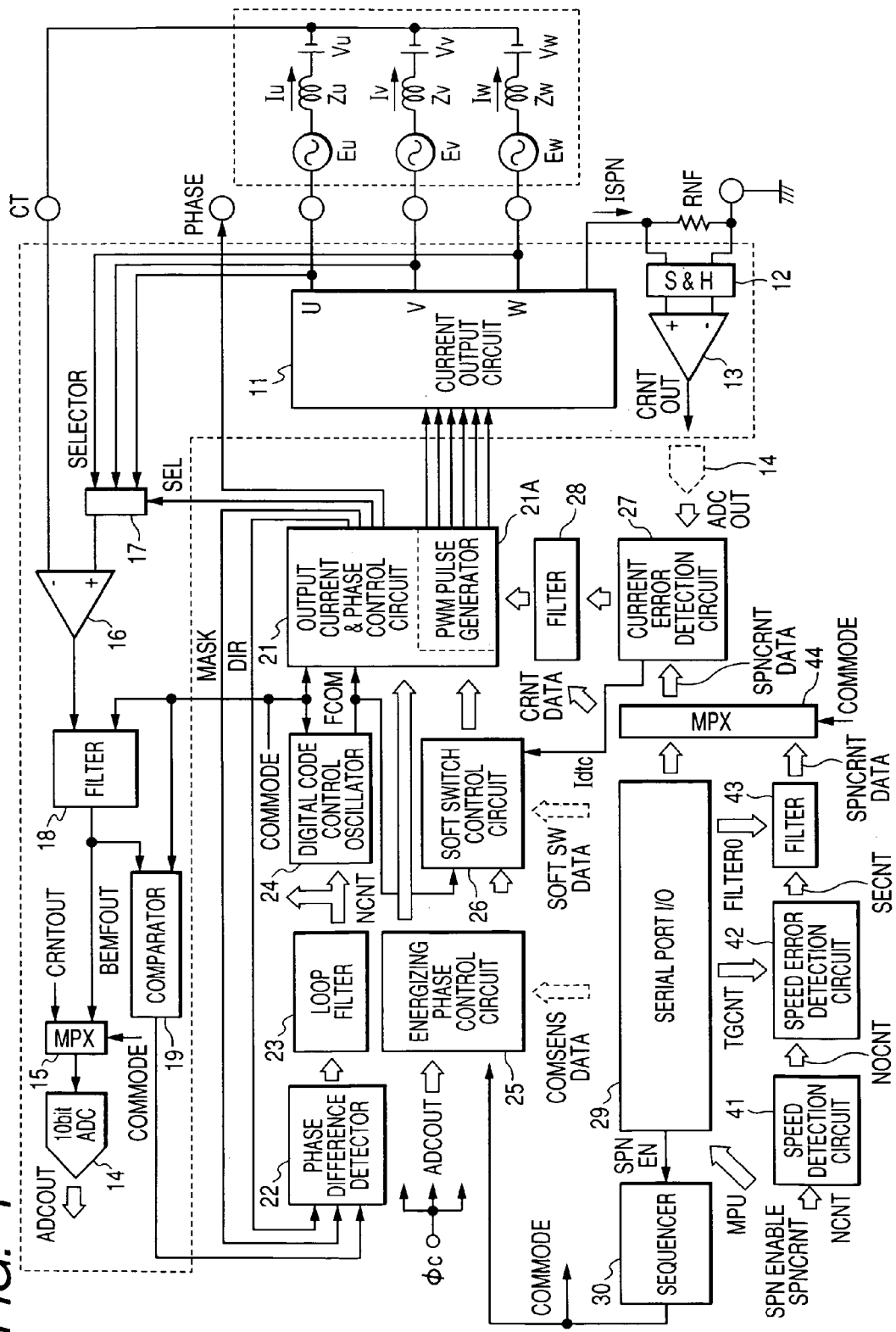

FIG. 1 illustrates a schematic configuration in which the present invention is applied to a drive control circuit of a three-phase brushless motor used for the spindle motor in a hard disk drive and the like. The circuit illustrated in FIG. 1 is formed on one or several semiconductor substrates of single crystal silicon or the like, except coils Lu, Lv, and Lw of the motor.

In FIG. 1, a current output circuit 11 sequentially supplies currents to the coils Lu, Lv, and Lw of the three-phase brushless motor. An output current & phase control circuit 21 generates PWM (Pulse Width Modulation) signals for driving output transistors of the current output circuit 11 and controlling output currents, and supplies the PWM signals to the current output circuit 11; and it supplies a selector 17 with a signal SEL for selecting coil terminals that detects back electromotive forces. The symbol RNF represents a current detecting resistor that detects the total current flowing through the three coils Lu, Lv, and Lw, and is connected to the current output circuit 11 in a manner that the total current flows through the resistor. A sample & hold circuit 12 takes in a potential difference across both the terminals of the current detecting resistor RNF. A current-detecting differential amplifier 13 detects the magnitude of the coil current from the potential difference across both the terminals of the current detecting resistor RNF. An output voltage CRNTOUT of the current-detecting differential amplifier 13 is converted into a digital signal by an AD converter (ADC) 14. The converted digital signal is supplied to a current error detection circuit 27.

In this embodiment, the ADC 14 is configured with 10 bits, which is not restricted; and it is also used for converting the back electromotive forces of the coils into digital signals. In order to realize this, a multiplexer 15 is provided in the pre-stage of the ADC 14. The multiplexer 15 switches the output voltage CRNOUT from the current-detecting differential amplifier 13 and a back electromotive force B-EMFOUT detected by an amplifier 16, and supplies the switched result to the ADC 14.

The back electromotive force detecting amplifier 16 detects the voltages by the back electromotive forces that the coils Lu, Lv, and Lw generate across the output terminals u, v, and w of the current output circuit 11 and a center tap CT. The inverted input terminal of the amplifier 16 is supplied with the voltage from the center tap CT. The non-inverted input terminal of the amplifier 16 is supplied with either one of the voltages from the terminals u, v, and w of the coils Lu, Lv, and Lw, which is selected by the selector 17. Thus, the amplifier 16 sequentially detects the voltages by the back electromotive forces that the coils Lu, Lv, and Lw generate.

The selector 17 is controlled by the selection signal SEL from the output current & phase control circuit 21. A filter 18 removes noises from the back electromotive forces detected by the amplifier 16 to be the back electromotive force B-EMFOUT. The back electromotive force B-EMFOUT with the noises removed is supplied to the ADC 14 through the multiplexer 15. The back electromotive force B-EMFOUT is converted into a digital signal. The converted digital signal is supplied to a energizing phase control circuit 25, which will be described later.

A comparator 19 performs binarization to the back electromotive force B-EMFOUT, and detects the zero crossing point of the back electromotive force. A phase difference detector 22 detects a phase difference between each of the zero crossing points of the back electromotive force B-EMFOUT outputted from the comparator 19 and each of the zero points of the drive currents by each phase of the motor that are outputted from the output current & phase control circuit 21. A loop filter 23 performs the phase compensation to the control system. A digital code control oscillator (counter) 24 oscillates a frequency in correspondence with an output value (digital code) NCNT from the loop filter 23. The output from the oscillator 24 is used as a reference clock PWMCLK, when the output current & phase control circuit 21 generates the PWM signal.

The PLL (phase-locked loop) is formed with the phase difference detector 22, loop filter 23, oscillator 24, output current & phase control circuit 21, and a feedback path to the phase difference detector 22 from the output current & phase control circuit 21. The phase control by this PLL controls the operation of the oscillator 24 so as to bring the phase of the signal giving the zero crossing point of the back electromotive force B-EMFOUT into coincidence with the phase of the signal outputted from the output current & phase control circuit 21, to thereby lock the frequency (1 to 2 kHz) of the drive voltages applied to the coils.

The energizing phase control circuit 25 determines a energizing phase on the basis of an induced voltage generated in a coil of a non-energizing phase when the output current & phase control circuit 21 makes flow such a short pulse current that the rotor will not respond from any of the phases toward the other phase while the motor is stationary, and the back electromotive force B-EMFOUT detected by the amplifier 16, which is generated while the motor is rotating. The energizing phase control circuit 25 energizes the coil of the determined energizing phase for a defined time by a defined number of times to rotate the rotor, thus starting the motor.

In concrete, when such a short energizing is performed to each of the coils that the rotor will not respond, the mutual inductances between the coils vary depending on the positions of the magnetic poles because of the magnetic saturation phenomenon. That is, the magnitudes of the induced voltages by the mutual induction generated in the coils of the non-energizing phases will vary. Using this fact attains the detection of the positions of the magnetic poles and the determination of the energizing phase. The method of detecting the position of the magnetic pole and determining the energizing phase, and the method of starting the motor are described in detail in the Patent Document 1.

A serial port 29 performs the transmission and reception of data with the microprocessor (MPU) not illustrated and so forth. The serial port 29 receives a serial clock SCLK, the current command value SPNCRNT for the spindle motor, an operational mode information COMMODE, and commands, etc., which are supplied from the MPU, and generates control signals to the inside of the drive control circuit based on the received mode information.

A sequencer 30 controls the whole circuit illustrated in FIG. 1. A soft switch control circuit 26 generates wave information on applied voltages to the current output circuit 11 by arithmetic calculations in accordance with the detected values of the currents flowing through the coils. The current error detection circuit 27 detects the difference (current error) between the current value to the coil detected by the current-detecting differential amplifier 13 and the current command value supplied from the MPU by way of the serial port 29. A filter 28 accumulates current errors detected by the output from the current error detection circuit 27, while performing phase compensation.

The current error information outputted form the filter 28 and the wave information generated by the soft switch control circuit 26 are supplied to the output current & phase control circuit 21. Using these information, the output current & phase control circuit 21 generates the PWM signals to drive the output transistors. The PWM signals are supplied to the current output circuit 11, which controls the output currents flowing through the coils. Since the control by the soft switch control circuit 26 are described in detail in the Patent Document 1, the detailed description thereof will be abbreviated here in this specification.

The output current Iout is expressed as the following formula.

$$Iout = \{(Vcc \times DTY) - B\text{-}EMF\}/RL$$

Here, DTY is the duty (rate of pulse width to one cycle) of the PWM signal, B-EMF is the back electromotive force of the coil, and RL is the resistance of the coil.

Therefore, as the duty DTY of the PWM signal varies, the output current Iout of the coil is controlled according to the above formula. The output current & phase control circuit 21 determines an output current value such that the current error becomes '0' based on the current error information from the filter 28, and determines the duty DTY of the PWM signal according to the above formula, based on the determined output current value.

The drive voltage waveform is formed with 16 PWM pulses by each electrical angle 60° in the drive control circuit of this embodiment, which is not especially restricted. That is, while the rotor turns by the electrical angle 60°, the 16 PWM pulses are formed; by the 16 PWM pulses, the output transistors are on-off controlled by 16 times. The pulse width of each of the 16 PWM pulses is varied in accordance with the detected current value, and the drive voltage waveform is formed.

The drive control circuit of this embodiment further includes a speed detection circuit 41, a speed error detection circuit 42, a filter 43, and a multiplexer 44. The speed detection circuit 41 inputs the output value NCNT (information on the number of rotations) from the loop filter 23 in the PLL phase control, and sequentially adds the NCNT to output speed information NOCNT on the electrical angle 360° each by the electrical angle 360°. The speed error detection circuit 42 detects a difference between the speed information NOCNT outputted from the speed detection circuit 41 and target speed information TGCNT supplied from the MPU. The filter 43, performing the phase compensation of the speed control loop, accumulates detected speed errors to convert the accumulated into a current value SPNCRNTDATA. The multiplexer 44 selects the current value SPNCRNTDATA converted by the filter 43 or the current command value SPNCRNT supplied from the MPU by way of the serial port 29, and supplies the result to the current error detection circuit 27. Here in this specification, the speed control and the control of the number or rotations are the same in the meaning; and the speed of rotation and the number of rotations are the same in the meaning. The speed detection circuit 41, the speed error detection circuit 42, and the filter 43 configure a speed comparing circuit.

To set a filter constant FILTER0 and an initial value PRE to the filter 43 is made possible from the external MPU through the serial port 29. The target speed information TGCNT is expressed as the formula, TGCNT=fc/(Nt/60). Here, Nt is the target number of speed (rpm), and fc is the frequency of the master clock φc supplied from the control LSI. In FIG. 1, the area surrounded by the dotted lines is the part of analog circuits, and the other area is the part of digital circuits. Most of the digital circuits operate synchronously with the master clock φc. In this embodiment, the master clock φc is a signal of some 10 MHz, against the PWM control band of some 100 kHz.

Figure 2:
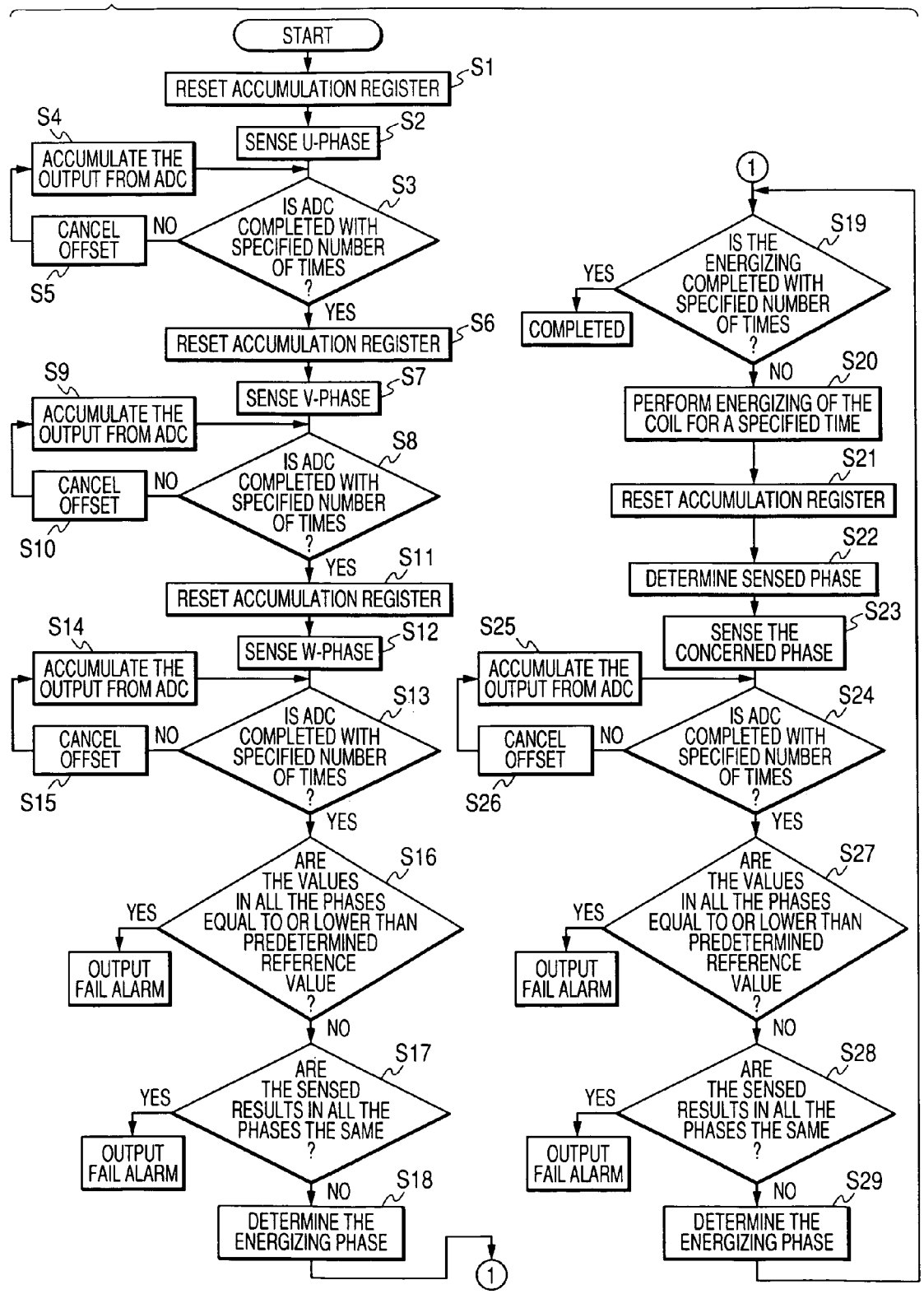
FIG. 2 is a flow chart illustrating the process of detecting the potions of the magnetic poles in the rotor and the process of determining the energizing phase in the drive control circuit of the embodiment.

Next, the detection of the positions of the magnetic poles and the determination of the energizing phase by the control drive circuit in this embodiment will be descried with FIG. 2. The detection of the positions of the magnetic poles in this embodiment is performed based on the event that the mutual inductances between the coils will vary depending on the positions of the magnetic poles by the magnetic saturation when such a short pulse current that the rotor will not respond is carried to the coils, and the magnitudes of the induced voltages will vary by the mutual induction generated in the coils of the non-energizing phases.

FIG. 2 illustrates the process of detecting the potions of the magnetic poles in the rotor and the process of determining the energizing phase in view of the function.

Prior to stating the process, the step S1 resets an accumulation register, being provided in the energizing phase control circuit 25, which holds to accumulate the AD conversion results in the ADC 14. The following steps detect an induced voltage by a predetermined number, wherein the induced voltage is generated in the 'U-phase' coil by the mutual induction phenomenon in carrying a short pulse current that the rotor does not respond to the V-phase and W-phase coils; make the ADC 14 convert the induced voltage detected and make the accumulation register accumulate the conversion result; and repeat the same operation with the direction of the current reversed (steps S2 to S4).

The step S5 operates the ADC 14 in the state that any current is not yet carried to the coils, makes the accumulation register accumulate the conversion result, detects an offset of the detection system for the U-phase coil, and cancels the offset. The offset of the detection system includes the back electromotive force B-EMF generated by the rotation of the motor, in addition to the offset of the detection circuit. The repetitive number of the detection is some 10 times to some 100 times. To accumulate the AD conversion results in this manner will enhance the S/N ratio of the detected value.

Next, the step S6 resets the accumulation register again, and then the following steps carry the short pulse current that the rotor does not respond to the U-phase and W-phase coils, detect an induced voltage generated in the 'V-phase' coil this time by the predetermined number, make the ADC 14 convert the induced voltage detected and make the accumulation register accumulate the conversion result, and repeat the same operation with the direction of the current reversed (steps S7 to S9). And, the step S10 operates the ADC 14 in the state that any current is not yet carried to the coils, makes the accumulation register accumulate the conversion result, detects an offset, and cancels the offset value of the detection system for the V-phase coil.

The step S11 resets the accumulation register again, and then the following steps carry the short pulse current that the rotor does not respond to the U-phase and V-phase coils, detects an induced voltage generated in the 'W-phase' coil this time by the predetermined number, make the ADC 14 convert the induced voltage detected and make the accumulation register accumulate the conversion result, and repeat the same operation with the direction of the current reversed (steps S12 to S14). The step S15 operates the ADC 14 in the state that any current is not yet carried to the coils, makes the accumulation register accumulate the conversion result, detects an offset, and cancels the offset value of the detection system for the W-phase coil.

Figure 3:
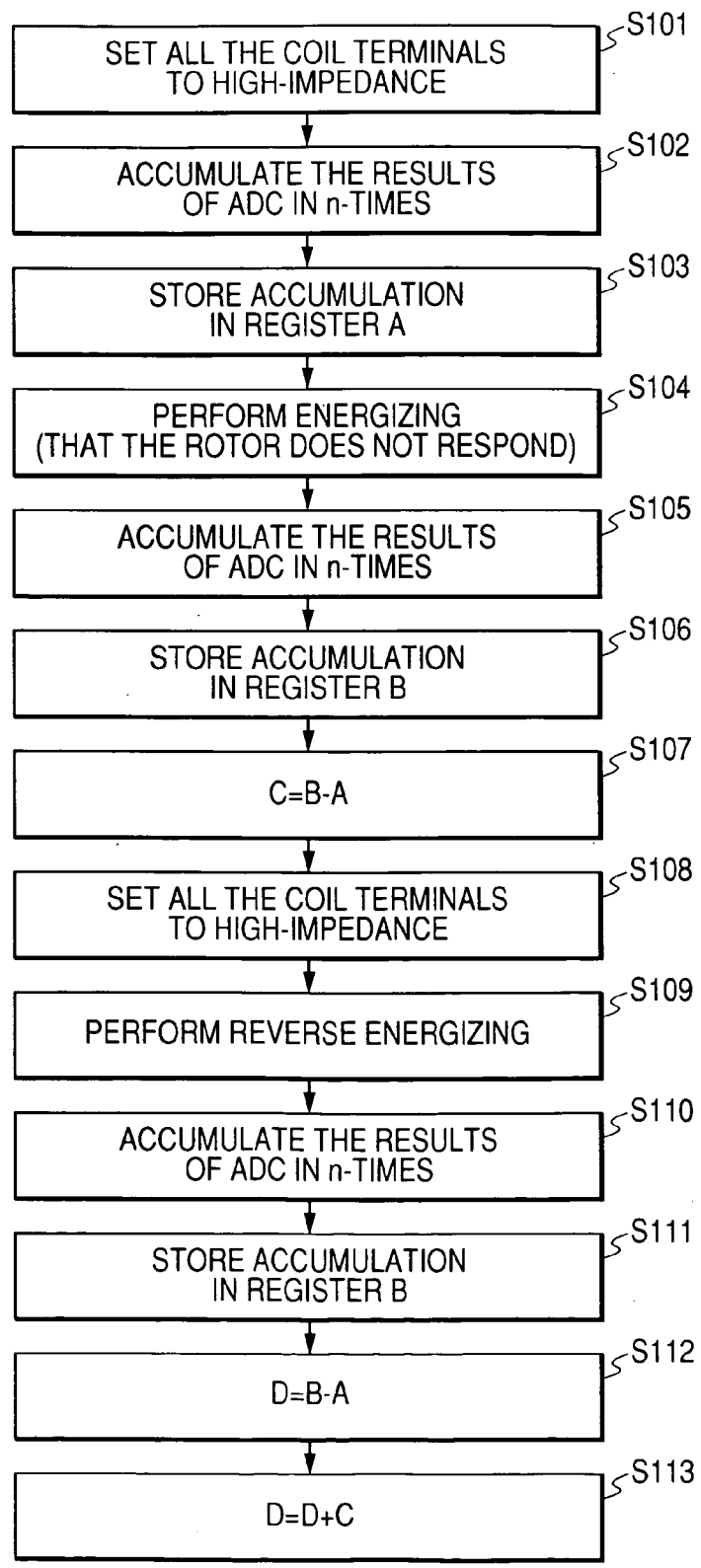
FIG. 3 is a flow chart illustrating the processing at the steps S2 to S5, S7 to S10, S12 to S15 of the flow chart in FIG. 2, in the form of the operational process of the circuit.

FIG. 3 illustrates the processing at the steps S2 to S5, S7 to S10, S12 to S15 in the form of the operational processes of the circuit.

First, each processing sets all the coil terminals U, V, and W to a high impedance state, namely, the state that any current is not carried, operates the ADC 14 by the predetermined number, and accumulates the conversion results in an accumulation register A (steps S101 to S103). The next processing carries a current that the rotor does not respond to the coils of the phases except the phase at attention repeatedly by the predetermined number, and makes an accumulation register B accumulate the conversion results by the ADC 14 (steps S104 to S106). Then, the step 107 subtracts the value of the register A from that of the register B, and stores the result in a register C. Thereby, the offset in the detection system of each coil can be cancelled.

The following processing sets all the coil terminals U, V, and W again to the high impedance state, resets the previous state, carries the current that the rotor does not respond to the coils of the phases except the phase at attention in the 'reverse direction' repeatedly by the predetermined number, and makes the accumulation register B accumulate the conversion results by the ADC 14 (steps S108 to S111). Then, the step 112 subtracts the value of the register A from that of the register B, and stores the result in a register D. Accordingly, offset of detection system of each coil is cancelled. Thereafter, the value of the register C is added to the value of the register D, and the result thereof is returned to the register D (replaceable with C). Thereby, the differences in the induced voltages by each current will remain in the register D. In regard to the register D, this embodiment provides three registers in correspondence with the three phases.

After performing the above processing each to the U-phase, V-phase, and W-phase, the step S16 in FIG. 2 checks if all the values of the registers D corresponding to the three phases are not higher than a predetermined criterion; if all the values are not higher than the predetermined criterion, the step judges it as a detection error and outputs an alarm. Further, the next step S17 checks the polarities of the values of the registers D corresponding to each phase, and checks if all the polarities are the same, namely, all the polarities are positive or negative; if all the polarities are judged as the same, the step judges it as a detection error and outputs the alarm. In both cases, such a consequence will not be brought if the system is normal.

If the step S17 judges that all the polarities are not the same, the step S18 determines the phase from the polarity of the value of the register D, to which the energizing is started. In concrete, the phase to which the energizing is started is determined according to the next Table 1. In Table 1, Eu is the induced voltage in the U-phase, Ev is the induced voltage in the V-phase, and Ew is the induced voltage in the W-phase. If the polarities of the induced voltages in all the phases are detected, it will be possible to judge the potion of the magnetic pole of the rotor; accordingly, it is possible to determine the energizing phase and the direction of the current from the potion of the magnetic pole, as shown in Table 1. The system for determining the energizing starting phase is described in detail in the Japanese Unexamined Patent Publication No. 2000-90037. Since this system is not directly related with this invention, the detailed description thereof will be abbreviated in this specification.

TABLE 1

| | Induced voltage | | | Energizing start phase (direction |
|---|---|---|---|---|
| | Eu | Ev | Ew | of current) |
| Determination Result | Negative | Negative | Positive | V phase → U phase |
| | Positive | Negative | Positive | W phase → U phase |
| | Positive | Negative | Negative | W phase → V phase |
| | Positive | Positive | Negative | U phase → V phase |
| | Negative | Positive | Negative | U phase → W phase |
| | Negative | Positive | Positive | V phase → W phase |

Following the step S18 in FIG. 2, the steps S19 and S20 carry the current to the coil for a specified time by a specified number to rotate the rotor. The next step S21 resets the accumulation register, and the step S22 determines the phase to detect. The following steps carry the short pulse current that the rotor does not respond to the coils of the phases except the determined phase, detect an induced voltage generated in the coil of the phase at attention by the predetermined number, make the ADC 14 convert the induced-voltage detected and make the accumulation register accumulate the conversion result, and repeat the same operation with the direction of the current reversed (S23 to S26).

The offset of the detection system is cancelled by the steps S107 and S112 in this manner, whereby the result with an influence by the back electromotive force generated in the coil removed is left in the register D.

Accordingly, the induced voltage having an error due to the back electromotive force compensated can be obtained in the state that the motor is rotating during the processing of determining the energizing starting phase from the induced voltage; and using the induced voltage having the error compensated will make it possible to perform a more accurate position detection of the rotor.

The processing in the steps S23 to S26 are performed in the same procedures as the flow chart illustrated in FIG. 3. Therefore, the offset is cancelled in the mean-time. And, it is needed to perform the processing in the steps S23 to S26, with only one phase that is determined in the step S21. The reason is that the phase to detect next can be determined uniquely from the rotational direction with which the energizing is started at the step S20. To narrow down the phases to detect the induced voltages to one phase in this manner will make it possible to shorten the time for the detection and the time for accelerating the motor.

The following step S27, in the same manner as the step S16, checks if all the values of the registers D corresponding to the three phases are not higher than the predetermined criterion; if all the values are not higher than the predetermined criterion, the step judges it as a detection error and outputs the alarm. Further, the next step S28, in the same manner as the step S17, checks if the polarities of the values of the registers D corresponding to each phase are positive or negative; if all the polarities are judged as the same, the step judges it as a detection error and outputs the alarm. Here, the first judgment is able to use the value being left in the register D by the processing at the steps S1 to S18 as the value of the register D corresponding to the phase except the phases to which the processing at the steps S23 to S26 are performed. Thereafter, the step S29 determines the phase to which the energizing is performed at the step S20 according to Table 1, based on the values of the registers D corresponding to each phase.

Next, the method of controlling the phase (switching the phase) of the current carried to the coil in accordance with the phase of the back electromotive force will be described with reference to FIG. 4. The phase control method here uses the PLL, which is composed of the phase difference detector 22 that detects the zero crossing point of the back electromotive force of the coil, the loop filter, the digital code control oscillator 24, and the output current & phase control circuit. 25.

Such a phase control is performed because the torque to rotate the motor becomes the maximum, when the phase of the current carried to the coil is in accordance with the phase of the back electromotive force B-EMF generated in the coil. This phase control generates control signals UCOM, VCOM, and WCOM for switching the phases of the coils, synchronously with the zero crossing point of the back electromotive force B-EMF. In FIG. 4, the parts being the same as or correspondent to those in FIG. 1 are given the same symbols.

Figure 4:
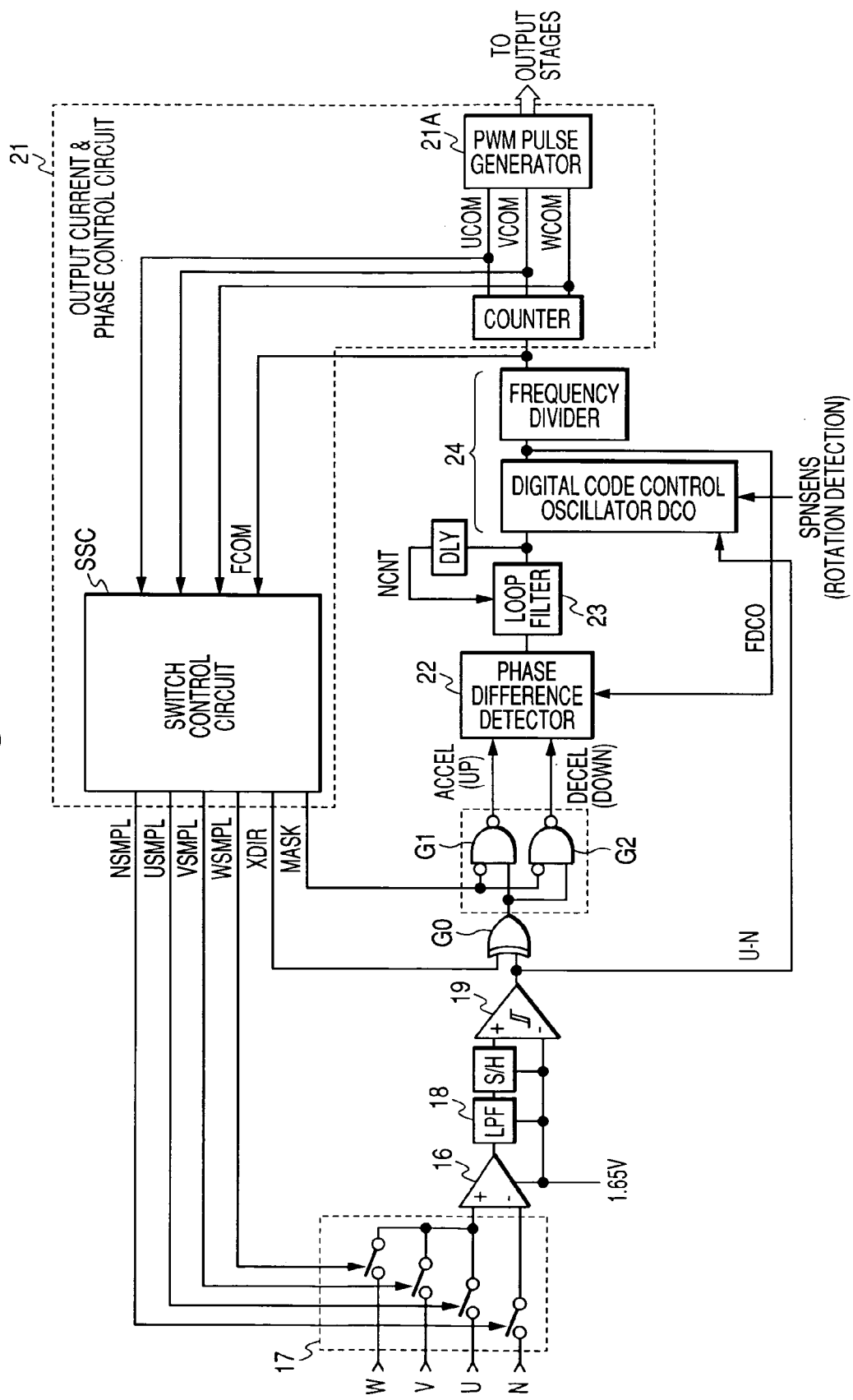
FIG. 4 is a block diagram illustrating part of the PLL phase control circuit in the drive control circuit of the embodiment.

In FIG. 4, an exclusive OR gate G0 inverts the output phase of the comparator 19, namely, the detected phase of the back electromotive force, corresponding to whether the back electromotive force varies from positive to negative or varies from negative to positive. NAND gates G1 and G2 operate according to a mask signal MASK from a switch control circuit SSC, so as not to input the output signal from the comparator 19 to the phase difference detector 22.

The phase control system in this embodiment detects only the back electromotive force B-EMF of one phase being the high-impedance among the outputs of the three phases. The phase difference detector 22 is composed of an up-down counter and so forth. The counter counts down when the back electromotive force B-EMF is higher than the potential of the center tap CT (High period) during the detection period, and counts up when it is lower than the potential of the center tap CT (Low period). The phase difference detector 22 detects the time of difference between the High period and the Low period as the phase error.

The period except the detection period is defined as the period of the detection masked, during which the phase difference detector 22 is reset. The mask signal MASK is generated at the timing being synchronous with a FCOM signal as the output of this PLL, inside the switch control circuit SSC in FIG. 4. The length of the masking time is determined by a constant rate against the cycle NCNT of the FCOM signal. The output of the phase difference detector 22 is sampled synchronously with the falling edge of the FCOM signal, and the sampled is integrated by the loop filter 23; thus, the cycle NCNT of a new FCOM signal is determined.

There are the following points to pay attention to the design of the circuit in this embodiment. The energizing phase is determined by the energizing phase control circuit 25, and the drive pulse based on the determined phase is applied to the motor to accelerate the rotation. However, such acceleration can be made below about 3% of the target rotational speed, and the motor has to be rotated by the control system in FIG. 4 within such a wide range of 3% to 90% of the target rotational speed. Therefore, the PLL of this system is required to have an extremely wide lock range, which is the first point. In case the PLL has such a wide lock range, a wrong setting of the initial value will easily generate a quasi phase-locked state. Therefore, the setting of the initial value has to be performed very precisely, which is the second point.

Accordingly, the phase control system in this embodiment provides a rotation detecting mode. In this mode, the coil terminals of the U-phase, V-phase, and W-phase are temporarily brought into the high-impedance immediately before the phase control by this system is started, and a timing tz and a frequency f0 at the zero crossing point of the back electromotive force B-EMF is detected. The phase control system sets the values tz and f0 detected in this mode to a register inside the digital code control oscillator 24 (or the loop filter 23) as the initial values, starts the phase loop control, and thereby attains the phase-locked state in a shortest time while preventing generation of the quasi phase-locked state.

Figure 5:
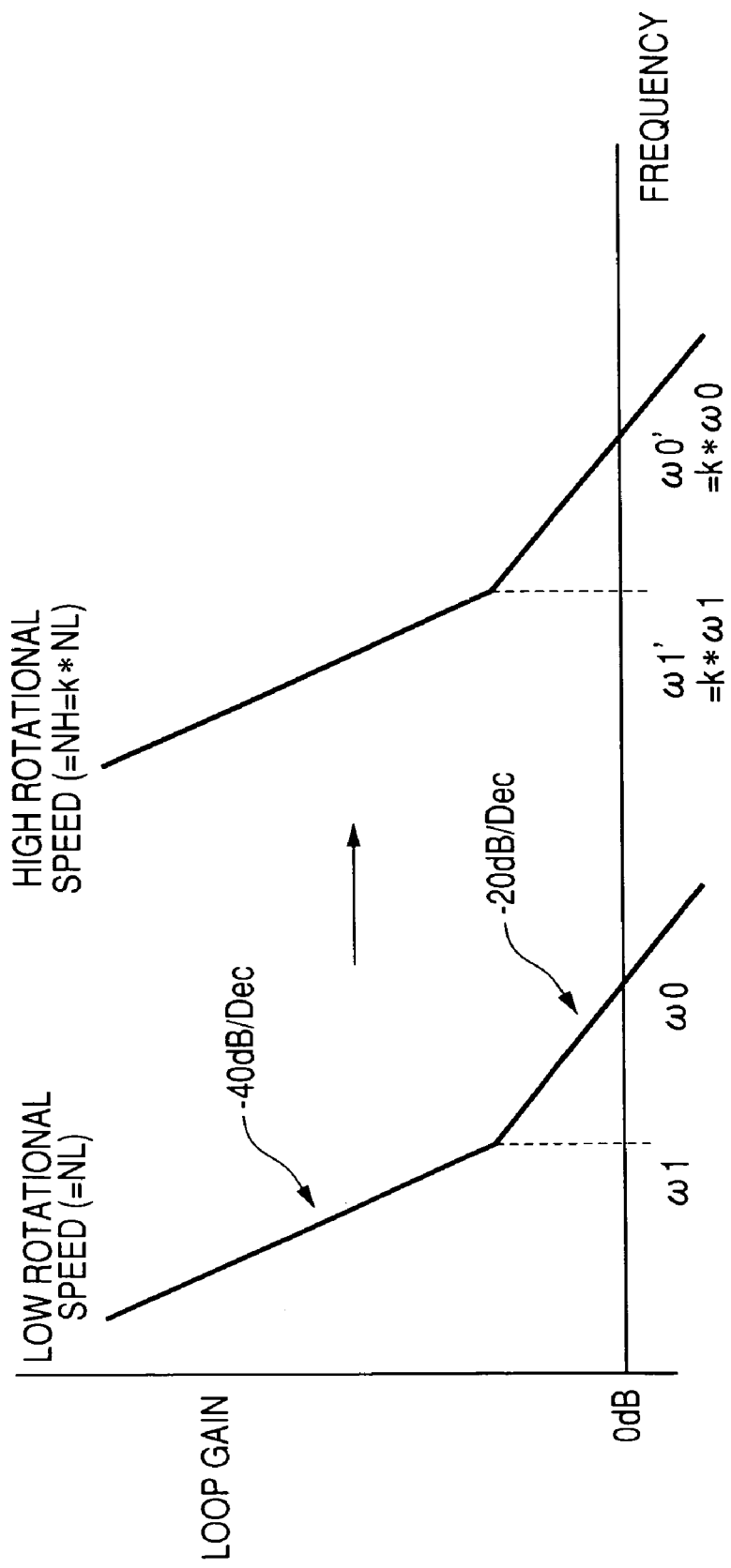
FIG. 5 is a graph explaining the frequency scaling of the loop gain of the PLL circuit in the drive control circuit of the embodiment.

Further, the phase control system in this embodiment delays the oscillation frequency information NCNT supplied from the loop filter 23 to the digital code control oscillator 24 one clock by a delay circuit, feeds back a one-clock delayed NCNT to the loop filter 23, and controls the gain of the loop filter 23 by the one-clock delayed NCNT. In concrete, the loop filter 23 is configured as follows. The gain of the loop filter 23 increases, when the oscillation frequency information NCNT demanding to raise the frequency is given to the digital code control oscillator 24; and the gain of the loop filter 23 decreases, when the oscillation frequency information NCNT demanding to lower the frequency is given to the digital code control oscillator 24. The characteristic of this loop filter is shown by the graphs as illustrated in FIG. 5.

Figure 6:
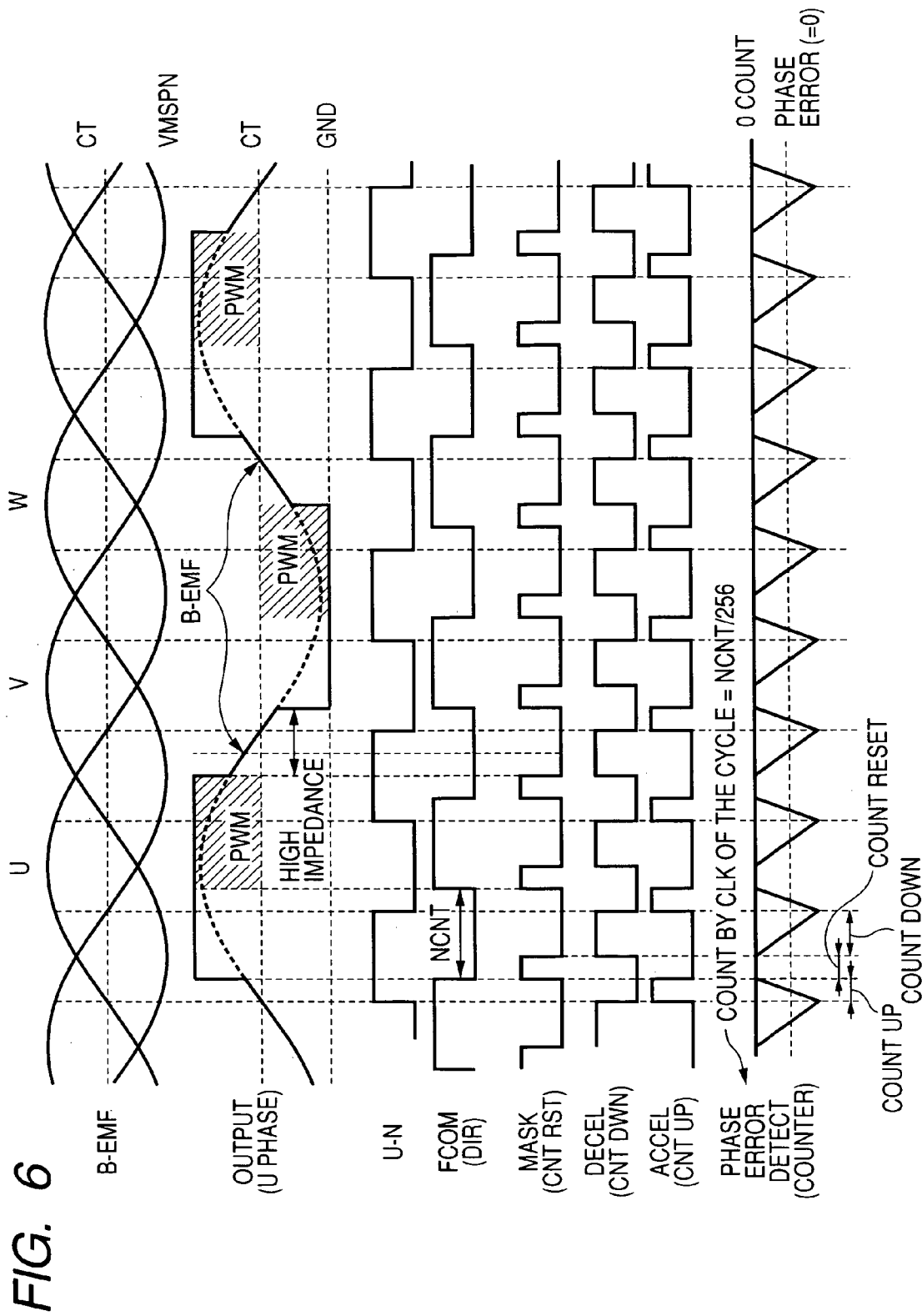
FIG. 6 is a timing chart of the signals in the phase-locked state of the PLL circuit in the drive control circuit of the embodiment.

In general, the transfer characteristic of the control loop is the second order (−40 dB/dec), and is provided with the phase compensation having the zero point of the first order at the frequency $\omega 1$ so that the transfer characteristic becomes the first order (−20 dB/dec) at the frequency $\omega 0$ in the 0 dB band ($\omega 1 < \omega 0$). In this phase control loop, as shown in FIG. 6, the sampling of the phase error is performed one time by one phase switching, namely, six times by one cycle of the back electromotive force B-EMF. That is, the sampling frequency is six times by the frequency of the back electromotive force B-EMF. As the frequency $\omega 0$ increases, the target trackability becomes better and the lock-up time is shortened. However, in view of the influence of delay by the sampling and the stability of the phase control loop, it is wise to set the frequency $\omega 0$ in the 0 dB band to $\frac{1}{10}$ to $\frac{1}{20}$ by the sampling frequency $\omega s$.

On the other hand, if the frequency $\omega 0$ is set based on a sampling frequency by some % of the steady rotational speed, the trackability will remarkably deteriorate when the motor reaches the steady rotational speed, which generates a locked-off state in the worst case. In order to solve this problem, the frequencies $\omega 1$ and $\omega 0$ are set in proportion to the rotational speed in this invention. Thereby, it is possible to attain a wide lock range and optimum trackability and stability constantly. In this embodiment, this is realized by delaying the oscillation frequency information NCNT (cycle of the FCOM signal), the set value to the digital code control oscillator 24, one clock by the delay circuit DLY, and feeding back the one-clock delayed NCNT to the loop filter 23, thus compensating the coefficient and gain of the loop filter 23.

Further, the phase control system in this embodiment performs the control such that the phase sensitivity of the phase difference detector 22 is made constant, by feeding back present oscillation frequency information FDC0 from the digital code control oscillator 24 to the phase difference detector 22. The phase difference detector 22 receives the signal giving the zero crossing point of the back electromotive force B-EMF and the signal giving an absolute time difference from the PLL oscillation signal. Therefore, if the rotational speed of the motor varies, the phase corresponding to the time difference will vary. Accordingly, the above control is made in order that the time difference signal supplied to the phase difference detector 22 can be regarded as the same phase difference signal, even if the rotational speed of the motor varies.

The phase difference detector 22 in this embodiment is composed of the up-down counter and so forth, as mentioned above. Therefore, if the phase difference detector 22 receives the detection signal of the back electromotive force B-EMF corresponding to such a wide rotational speed (some % of the steady speed to the steady), even if the detector 22 receives the same phase error in the operation using the clock of a constant cycle, the phase error becomes too large when the frequency is low (low rotational speed), and the up-down counter generates overflow in the calculation relating to the loop filter 23 at the following stage; consequently, the system cannot handle the wide input range of the rotational speed.

Accordingly, in order to maintain the gain (error count value against phase error angle) of the phase difference detector 22 at a constant regardless of the rotational speed, the phase control system in this embodiment feeds back to the phase difference detector 22 the oscillation frequency information FDC0 having a m-fold (for example, 256-fold) frequency against the set value NCNT (the cycle of the FCOM signal) inputted to the oscillator 24, so that the system can handle the wide input range.

FIG. 6 illustrates a state that the PLL is phase-locked. In the period that the mask signal MASK is in Low level and the signal U-N indicating the back electromotive force B-EMF positive or negative is in High level, the control signal DECEL to the phase difference detector 22 is in High level, so that the counter makes down-counting. In the period that the mask signal MASK is in Low level and the signal U-N is in Low level, the control signal ACCEL to the phase difference detector 22 is in High level, so that the counter makes up-counting. The difference between the up-counting and the down-counting is the phase error detected.

Figure 7:
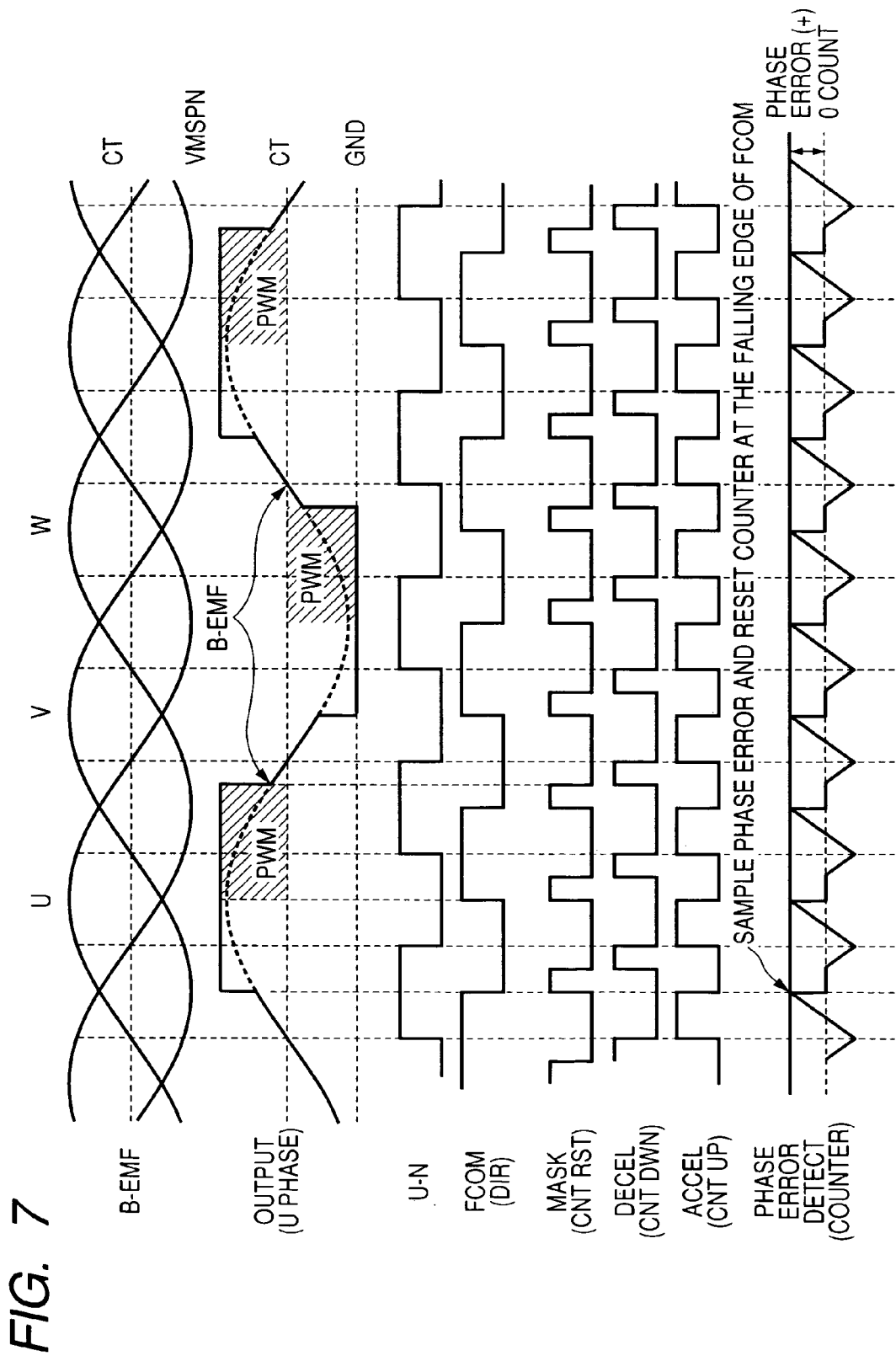
FIG. 7 is a timing chart of the signals in the phase lag of the PLL circuit in the drive control circuit of the embodiment.

In this phase-locked state, since the phase error is not generated, the up-count and the down-count become equal, and the output of the phase difference detector 22 becomes zero (zero count). FIG. 7 illustrates a state that the PLL detects a phase lag. In this case, since the count-up period is longer than the count-down period, the phase difference detector 22 outputs a positive phase error. The positive phase error shortens the cycle of the FCOM (phase switching) signal, and puts the phase in lead to adjust the phase error.

Figure 8:
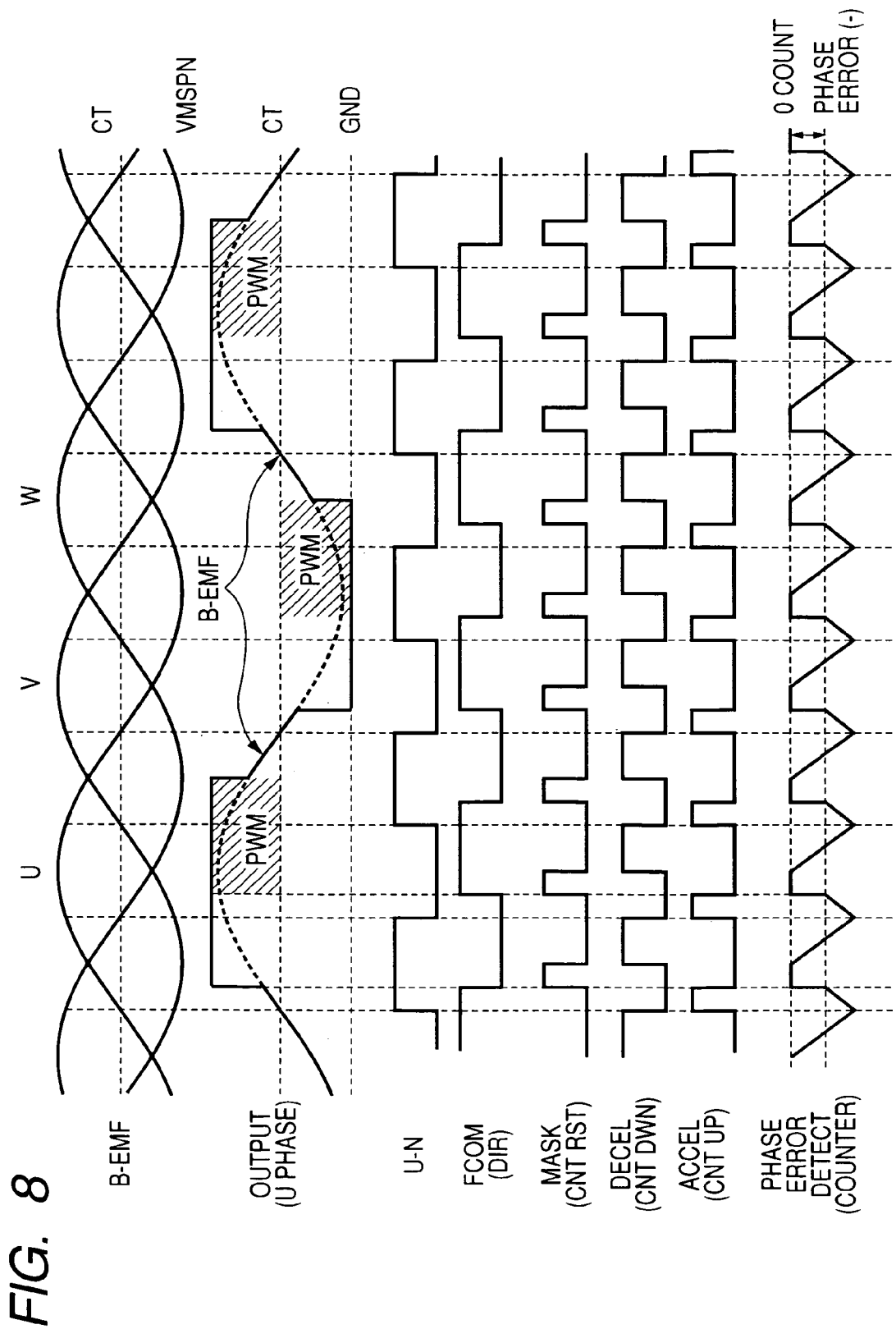
FIG. 8 is a timing chart of the signals in the phase lead of the PLL circuit in the drive control circuit of the embodiment.

FIG. 8 illustrates a state that the PLL detects a phase lead. In this case, since the count-up period is shorter than the count-down period, the phase difference detector 22 outputs a negative phase error. The negative phase error elongates the cycle of the FCOM (phase switching) signal, and puts the phase in lag to adjust the phase error. In FIG. 6 through FIG. 8, the drive output waveform (OUTPUT) is a full-swing waveform in the ranges of 30° to 135° and −30° to −135° in stead of the sine wave, which results from reducing the power loss. The drive system as such is described in the Japanese Unexamined Patent Publication No. 2002-35992. The detailed description thereof will be abbreviated here.

The speed control circuit (41 to 44) in the drive control circuit of this embodiment will be described with reference to FIG. 9 through FIG. 12.

The speed information (information on the number of rotations) NCNT supplied to the speed detection circuit 41 from the loop filter 23 is expressed as follows.

$$NCNT = fc/16 \cdot fcom \tag{1}$$

Here, fc is the frequency of the master clock φc, and fcom is the phase switching frequency. In this embodiment, the drive signal is composed of 16 pulses, which is applied to the output transistors during the rotor rotating by the electrical angle 60°. Therefore, the formula (1) contains the number 16 in the denominator.

As seen from FIG. 8, the phase switching is performed 6 times during the electrical angle 360° of the rotor, in the three phase AC drive. Therefore, if the frequency of the back electromotive force B-EMF, the one cycle of which corresponds to the electrical angle 360° of the rotor, is given by f BEMF, the expression f BEMF=fcom/6 is given. Therefore, the following formula is deduced from the formula (1).

$$f\,BEMF = fc/6 \cdot 16 \cdot NCNT \tag{2}$$

In this embodiment, the update cycle of NCNT is 1/fcom. Therefore, to attain the precise rotational speed information needs to add the rotational speed information by each phase switching and convert the added into the rotational speed information by the electrical angle 360°. Thus, the formula (2) is transformed into the following formula.

[Expression 1]

$$1/f\,B-EMF = 6 \cdot 1/f\,com \tag{3}$$

$$= 1/f_c \cdot \sum_{n=1}^{6}(16 \cdot NCNT)$$

Figure 9A:
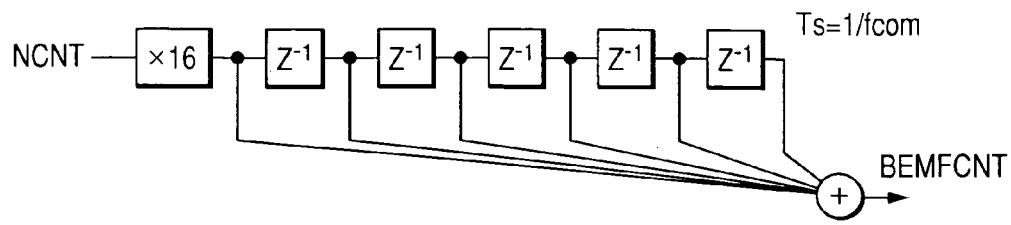
FIG. 9(A) and FIG. 9(B) is a block diagram illustrating a front half configuration of a speed detection circuit in a speed control circuit of the embodiment.
Figure 9B:
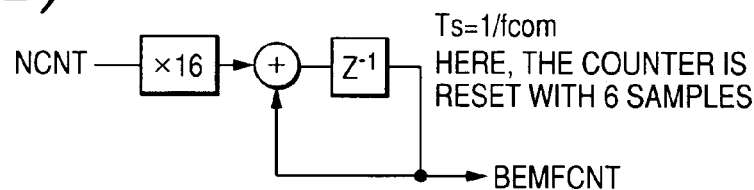

In this embodiment, the speed detection circuit 41 includes a computing unit composed of delay elements and adders, as shown in FIG. 9(A) or FIG. 9(B). The computing unit samples the rotational speed information NCNT from the loop filter 23 by the master clock φc, performs the calculation as shown by the following formula (4), and thereby attains the rotational speed information BEMFCNT.

[Expression 2]

$$BEMFCNT = \frac{F_c}{f_{B-EMF}} \tag{4}$$

$$= \sum_{n=1}^{6}(16 \cdot NCNT)$$

Now, provided that the number of rotations per minute of the motor is No (rpm), the number of rotations per second is f spn (Hz), and the number of magnetic poles (number of magnets) of the motor is P, the following relations are given.

$$No = 60 \cdot f\,spn$$

$$f\,spn = (2/P) \cdot f\,BEMF \tag{5}$$

And the formula (5) can be transformed into the following formula (6).

$$1/f\,spn = (P/2) \cdot (1/f\,BEMF) \tag{6}$$

Normally, the frequency f BEMF of the back electromotive force B-EMF is not constant during the mechanical angle 360° in an actual motor, by the influence of the polarization and wiring dispersions. Therefore, the precise cycle NOCNT of the motor is given by the following formula (7).

[Expression 3]

$$NOCNT = \sum_{m=1}^{P/2} BEMFCNT(m) \tag{7}$$

$$= \sum_{m=1}^{P/2}\sum_{n=1}^{6}(16 \cdot NCNT(n))$$

Figure 10A:
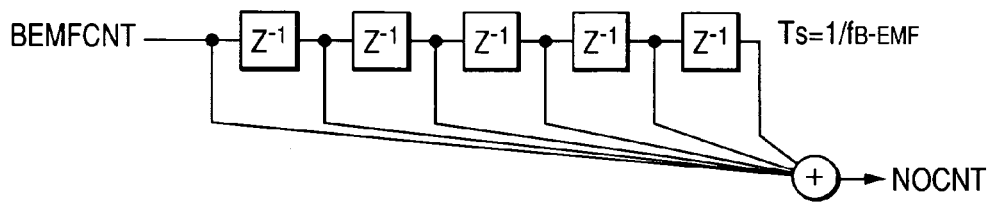
FIG. 10(A), FIG. 10(B) and FIG. 10(C) is a block diagram illustrating an end half configuration of the speed detection circuit in the speed control circuit of the embodiment.
Figure 10B:
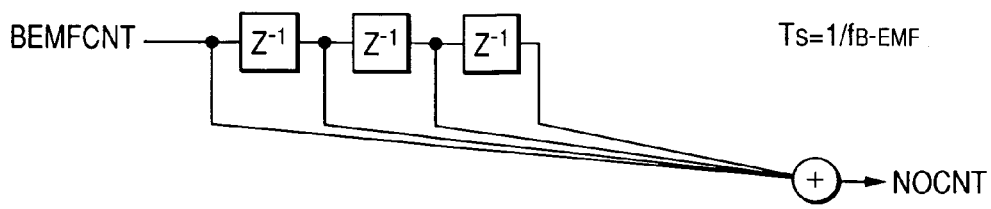
Figure 10C:
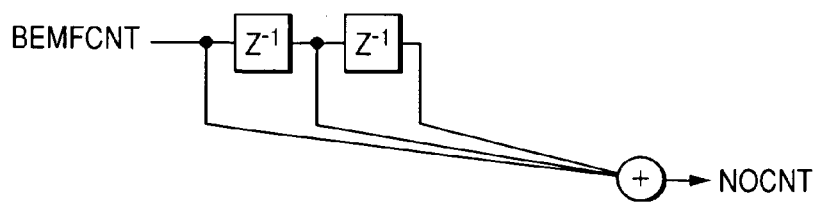

In this embodiment, the speed detection circuit 41 includes a computing unit as shown in FIG. 10(A), FIG. 10(B), or FIG. 10(C), corresponding to the number of the magnetic poles P. The computing unit samples the output BEMFCNT from the computing unit in FIG. 9(A) or FIG. 9(B) by the master clock φc, performs the calculation given by the formula (7), and thereby attains the precise rotational speed information NOCNT, in which the influence of the polarization dispersions and so forth is eliminated.

The rotational speed information NOCNT given by the formula (7) is the number of rotations per the mechanical angle 360°. Accordingly, the speed detection circuit 41 retains P/2 pieces of the output information BEMFCNT from the computing unit in FIG. 9(A) or FIG. 9(B), and outputs the information NOCNT with P/2 pieces of BEMFCNT added by 1/f BEMF, namely, by the electrical angle 360°, as shown in FIG. 11. Thereby, the speed detection circuit 41 is able to attain the rotational speed information NOCNT of the mechanical angle 360° by 1/f BEMF, namely, the rotational speed information NOCNT by P/2 times per one turn of the motor.

Figure 11A:
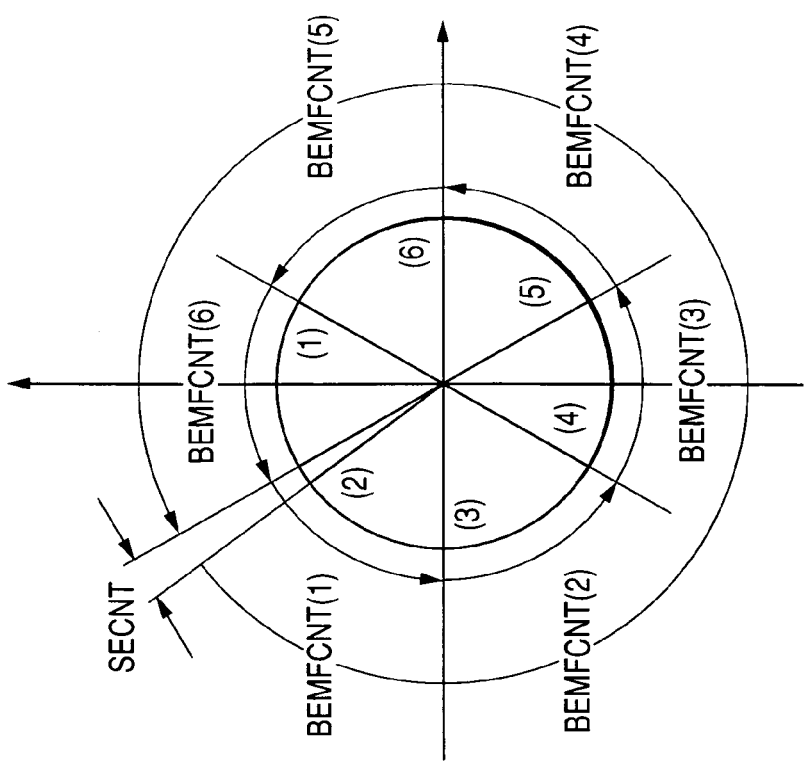
FIG. 11(A) and FIG. 11(B) is an explanatory chart illustrating a relation between the mechanical angle and the electrical angle and a speed error at a distance of 1/f BEMF in the drive control circuit of the embodiment.
Figure 11B:
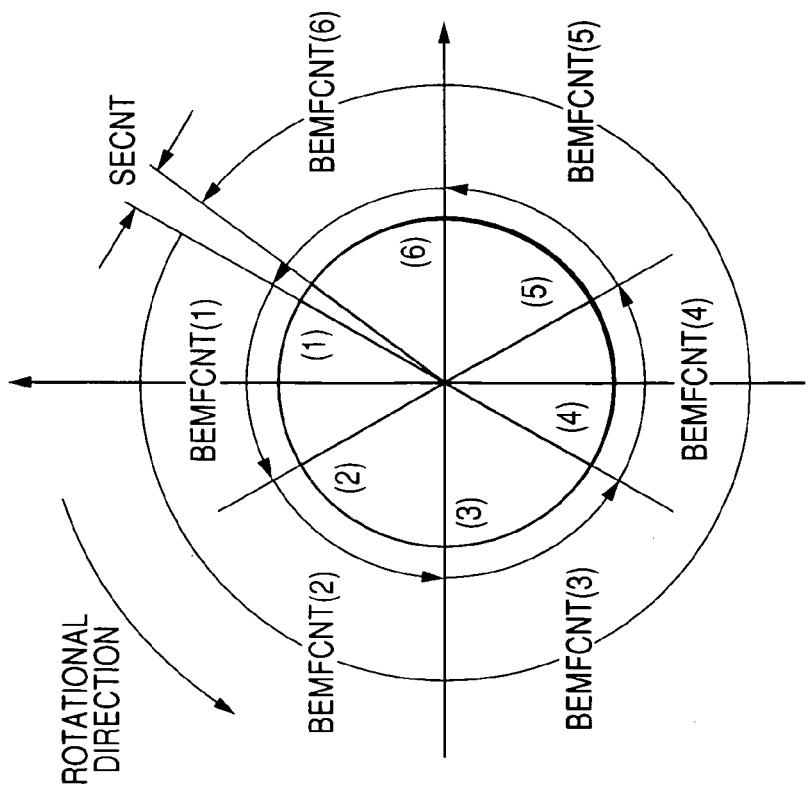

Thus, it becomes possible to bring the control band of the speed control into a higher band to enhance the response characteristic. Here, FIG. 11 illustrates the case of P=12, in which FIG. 11(B) illustrates the state after 1/f BEMF elapses from the state of FIG. 11(A). By way of the state after 2/f BEMF elapses from the state of FIG. 11(A), the state after 3/f BEMF elapses from the state of FIG. 11(A), the state after 4/f BEMF elapses from the state of FIG. 11(A), and the state after 5/f BEMF elapses from the state of FIG. 11(A), it returns to the state of FIG. 11(A), which are not illustrated.

Figure 12:
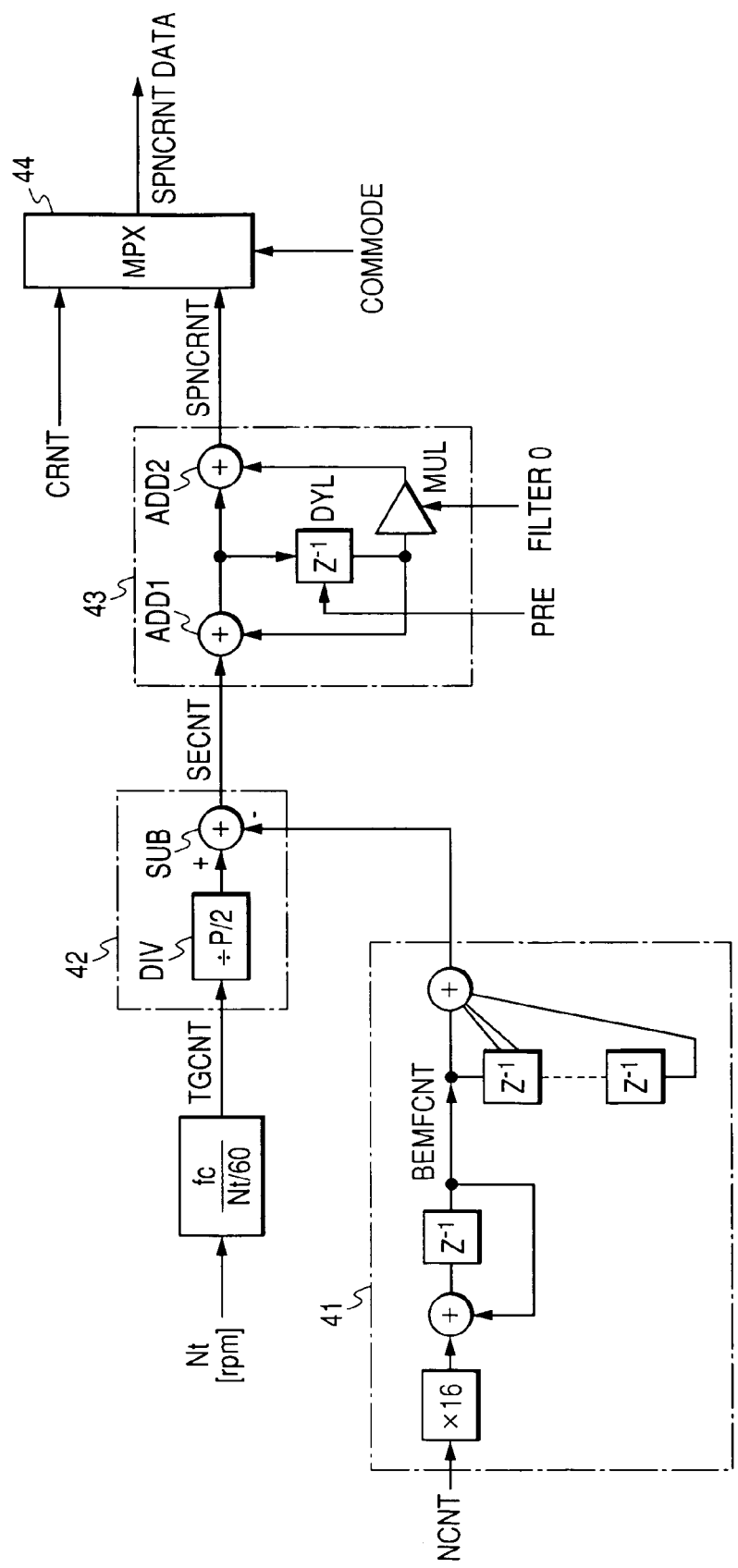
FIG. 12 is a block diagram illustrating a configuration of the speed control circuit in the drive control circuit of the embodiment.

FIG. 12 illustrates the overall functional configuration of the speed control circuit (41 to 44) in the drive control circuit of this embodiment. In FIG. 12, the speed detection circuit 41 inputs the output NCNT from the loop filter 23, multiplies the inputted NCNT by 16 by a multiplier, sequentially adds the multiplied, and outputs the speed information on the electrical angle 360° each by the electrical angle 360°. The speed error detection circuit 42 includes a subtractor SUB, which calculates a difference SECNT between the speed information NOCNT outputted from the speed detection circuit 41 and target speed information TGCNT supplied from the MPU, and outputs the difference SECNT. Concretely, the subtractor SUB subtracts the NOCNT obtained each by the electrical angle 360° from the TGCNT, and outputs the subtracted (TGNCT-NOCNT) as the difference SECNT to the filter 43. Here, to retain P/2 pieces of the information BEMFCNT will invite increase of the circuit scale. Since there is not any discrepancy in clamping the SECNT when the rotational speed exceeds some % of the target, this embodiment retains P/2 pieces of the value (2·TGCNT/P-BEMFCNT), namely, the value in which the BEMFCNT obtained each by the electrical angle 360° is subtracted from the TGCNT divided by P/2.

In case of P=12, provided that the difference (2·TGCNT/P-BEMFCNT) by the electrical angle 360° is given by ΔBEMFCNT (1), ΔBEMFCNT (2), - - - , ΔBEMFCNT (6), the difference SECNT is expressed as follows.

$$SECNT=\Delta BEMFCNT (1)+\Delta BEMFCNT (2) \text{- - -} +\Delta BEMFCNT \quad (6)$$

The filter 43 includes two adders ADD1 and ADD2, a delay element DLY, and a multiplier MUL, performs the calculation expressed by the following formula (8), and outputs the calculated as the current information SPNCRNT.

$$SPNCRNT=\Sigma SECNT+FILTER0\cdot \Sigma SECNT \quad (8)$$

The multiplexer 44 at the following stage selects the current command value CRCNT from the MPU or the SPNCRNT outputted from the filter 43 according to the mode, and supplies the selected to the current error detection circuit 27. Here, in the formula (8), FILTER0 is a filter constant.

The delay element in the filter 43 is made up with latches or registers. The delay element retains the preset value PRE supplied from the MPU, and while retaining this preset value PRE, cuts off the output SECNT from the speed error detection circuit 42 so as not to supply it to the filter 43, or forcibly nullifies the SECNT so as to clamp the output SPNCRNT to a constant value. The characteristic of the filter 43 is given by the filter constant FITER0.

Figure 13:
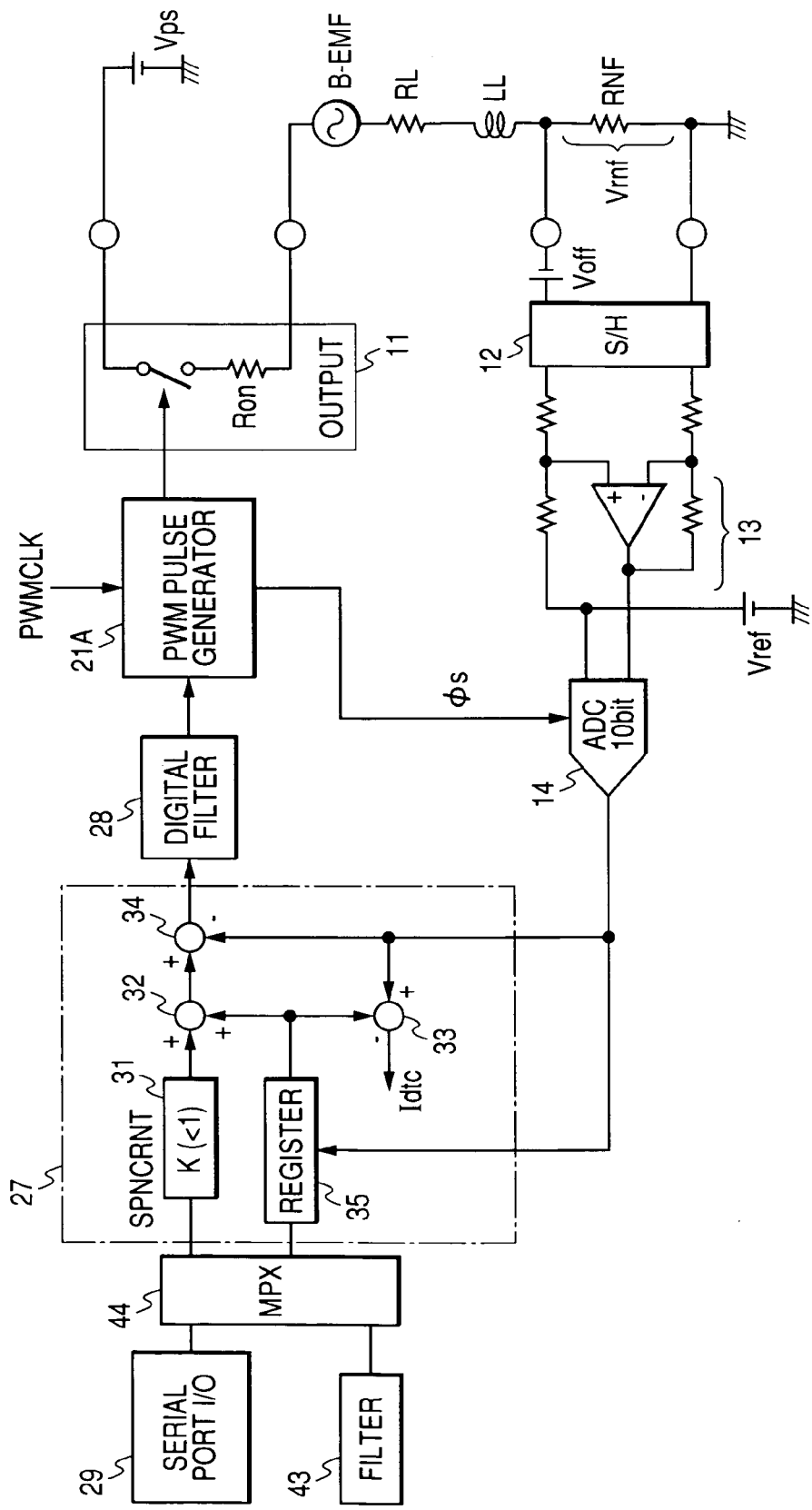
FIG. 13 is a block diagram illustrating the circuit that controls drive currents flowing through the coils in the drive control circuit of the embodiment.

Next, the circuit that controls the drive currents flowing through the coils (drive current control system) will be descried with reference to FIG. 13. The drive current control system includes: the sample & hold circuit 12 that takes in the potential difference across both the terminals of the current detecting resistor RNF, the current-detecting differential amplifier 13 that amplifies the potential difference detected, the AD converter 14 that converts the current detected by the amplifier 13 into a digital value, the current error detection circuit 27 that detects the difference between the detected current and the current command value SPNCRNT supplied from the MPU or the output SPNCRNT from the filter 43, the digital filter 28, and the output current & phase control circuit 21. In FIG. 13, the parts being the same as or correspondent to the circuit in FIG. 1 are given the same symbols.

In FIG. 13, a correction operator 31 multiplies the current command value SPNCRNT supplied from the MPU by a coefficient to correct the current command value. Adders 32 and 33 cancel the offset values. An adder 34 attains an error between the current command value SPNCRNT and the coil current detected. These operators constitute the current error detection circuit 27. The digital filter 28 generates the values corresponding to the current errors detected by the current error detection circuit 27. The output from the digital filter 28 is supplied to a PWM pulse generator 21A inside the output current & phase control circuit 21. The adder 33 adds a value held in a register 35 in advance on the digital value that is detected by the current detecting resistor RNF and is converted by the ADC 14, and thereby attains a precise current I dtc. The current I dtc is supplied to the soft switch control circuit 26.

There are some points to pay attention to the design of this circuit. First, it is necessary to cancel the offsets that the current-detecting differential amplifier 13 and the AD converter 14 contain; if the offsets are not canceled, the accuracy of the minute current area will deteriorate, and the controllable current range will be narrowed; this is the one point. It is also necessary to adjust the sampling clock φs of the current to the center of the ON-period of the PWM drive; this is another point. The reason for this adjustment lies in that the current near the center of the ON-period of the PWM drive coincides with the average current most, and sampling the current at the center will enable a highly precise current control.

Accordingly, the drive current control system in this embodiment, before starting the position detection of the rotor and the rotation control of the motor based thereon, makes the sample & hold circuit 12 take in the potential difference across the current detecting resistor RNF without carrying the currents to the coils, makes the current-detecting differential amplifier 13 amplify the potential difference, makes the register 35 hold a digital value into which the ADC 14 converts the potential difference amplified, and makes the adder 32 add the value of the register 35 on the current command value SPNCRNT supplied from the MPU or the output SPNCRNT from the filter 43. Thus, the system detects the offsets contained in the current-detecting differential amplifier 13 and the ADC 14, and cancels the offsets, thereby preventing the accuracy of the minute current area from deteriorating and the controllable current range from being narrowed.

Figure 14:
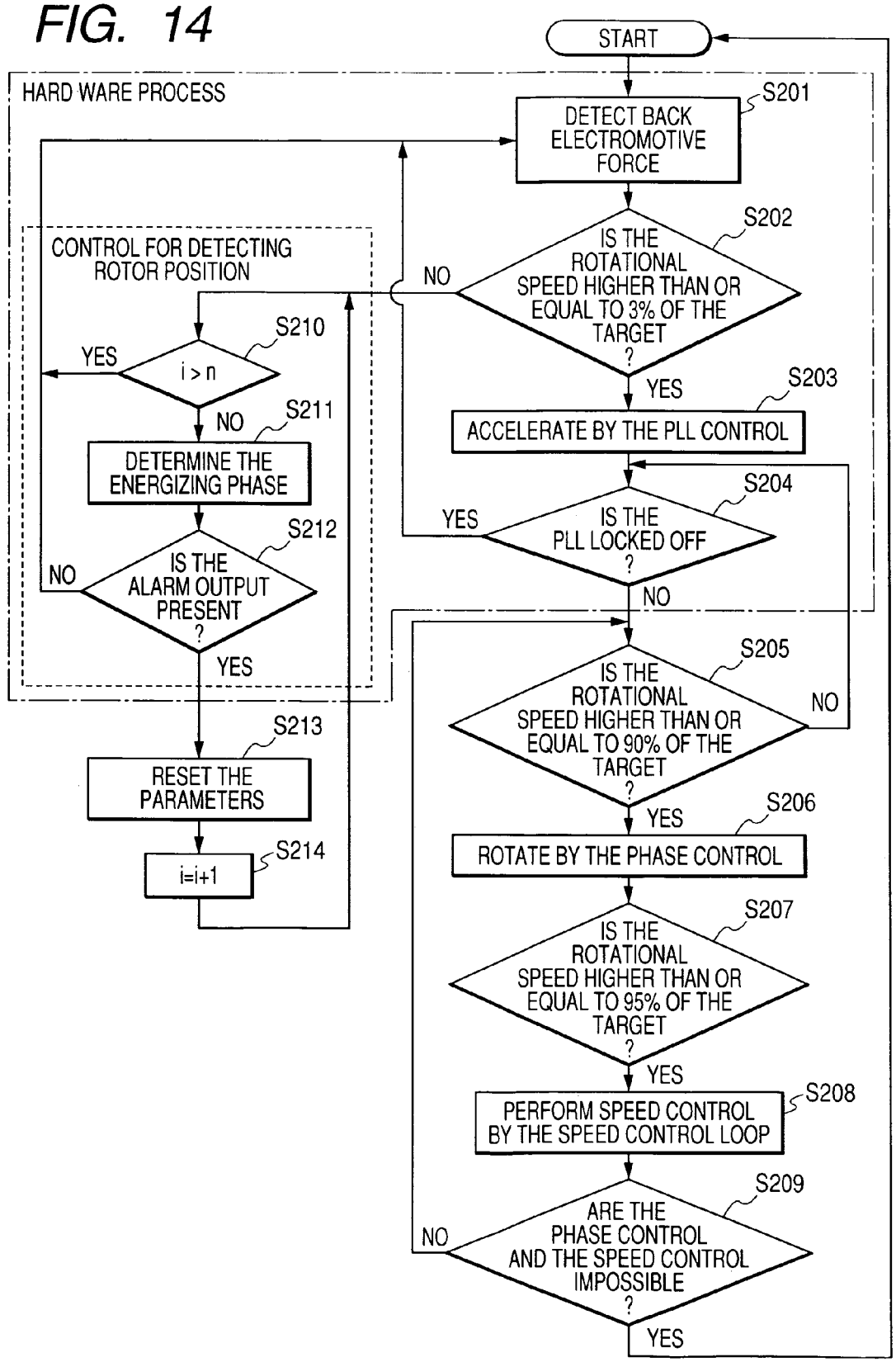
FIG. 14 is a flow chart illustrating the processes from starting the motor till reaching the steady rotation in the drive control circuit of the embodiment.

Next, the processes from starting the motor till reaching the steady rotation in the drive control circuit of this embodiment as constructed above will be described with the flow chart in FIG. 14 and the timing chart in FIG. 15.

First, step S201, receiving the start command of the motor, detects the back electromotive forces generated in the coils, and detects the rotational speed of the motor. This is done in view of a case that there occurs a temporary short break of the power supply, and after the power is restored, a command to start the motor is issued. Since the motor is in halt in a normal condition, the following step S202 judges that the rotational speed of the motor is not higher than 3% of the target speed, and the step moves to the step S210. Then, the energizing phase determination processing at the step S211 is performed according to the processes illustrated in FIG. 2. Normally, the motor is started to rotate by this processing.

Thereafter, the step S212 checks whether there are the alarm outputs at the steps S16, S17, S27, and S28. If there are, the step S213 resets the parameters of the sensing time in the step S2 and so forth in FIG. 2, and the energizing time in the step S104 and so forth in FIG. 3. The step S214 increments the repetitive number i by '+1', and the step returns to the step S210. The step S210 judges whether the repetitive number i exceeds a specified number n, and if it exceeds the specified number, the step returns to the step S201, where the back electromotive forces of the coils are detected and the rotational speed of the motor is detected. After completing the energizing phase determination processing at the step S211 by the specified number, the motor is started to rotate in most cases. When the step S212 does not detect the alarm output, the motor is already started to rotate, the step returns to the step S201, where the back electromotive forces of the coils are detected and the rotational speed of the motor is detected.

If the step S202 judges that the rotational speed of the motor exceeds 3% of the target speed, the step S203 accelerates the rotational speed of the motor by performing the phase control (phase switching) by the PLL as described with FIG. 4, in which the phases of the currents carried to the coils are adjusted to the phases of the back electromotive forces generated in the coils. The following step S204 judges if the PLL is locked off, and if it is locked off, the step returns to the step S201 to repeat the above processing. Here, the above start control is performed with the frequency of the oscillator 24 fixed at, for example, 100 kHz.

If the step S204 judges that the PLL is not locked off, the next step S205 judges whether the rotational speed of the motor exceeds 90% of the target speed; until it exceeds 90%, the acceleration of the motor is continued by the PLL control. The acceleration of the motor by the PLL control is performed by rewriting the values in the register, so that the oscillation frequencies become higher sequentially. This rewriting is performed by the sequencer 30. When the rotational speed of the motor exceeds 90% of the target by the acceleration control in such an open loop, the step goes to the step S206, and performs the phase control by the soft switch control circuit 26. There, the voltages are applied to the coils so that the phases thereof lead by Δθ against the phases of the back electromotive forces B-EMF generated in the coils, and thereby the phases of the coil currents are brought into coincidence with the phases of the back electromotive forces B-EMF.

The next step S207 judges whether the rotational speed of the motor exceeds 95% of the target speed; if it exceeds 95%, the step goes to the step S208, where the speed control is performed by the speed control loop including the speed detection circuit 41. Thereafter, the step S209 judges whether the rotational speed of the motor is within ±4% of the target, for example, and thereby judges whether the phase control and the speed control fall into a disabled state. If not disabled, the step returns to the step S205, checks the rotational speed, and continues the controls at step S206 through S208. Thereby, the motor attains the steady rotation normally. And, if the step S209 judges that the phase control and the speed control fall into a disabled state, the step returns to the step S201 to restart the processing.

When moving to the step S208, the MPU sends the initial value PRE with the value in the steady rotational state estimated to the filter 43 by way of the serial port 29, sends the command COMMODE to the multiplexer 44, whereby the multiplexer is switched into the filter 43, and transfers the operational mode into the closed loop to start the automatic speed control. Before switching the multiplexer 44 into the filter 43, the MPU cuts off the path by which the SENT outputted from the speed error detection circuit 42 is supplied to the filter 43, or forcibly nullifies the SENT, and thereby prevents the SENT, the speed error during acceleration, from being supplied to the filter 43.

This operation will restrain the rotational speed of the motor from overshooting the target, immediately after switching from the closed loop into the open loop.

In FIG. 15, the solid lines illustrate the variations with time of the current, rotational speed, rotational speed error, and hold value of the filter in the drive control circuit to which the speed control circuit of this embodiment is applied; and the dashed lines illustrate the variations with time of the current, rotational speed, rotational speed error, and hold value of the filter in the drive control circuit to which the speed control circuit of this embodiment is not applied.

Figure 15A:
FIG. 15 is a timing chart illustrating the variations with time of the current, rotational speed, rotational speed error, and hold value of the filter from starting the motor till reaching the steady rotation in the drive control circuit of the embodiment.
Figure 15B:
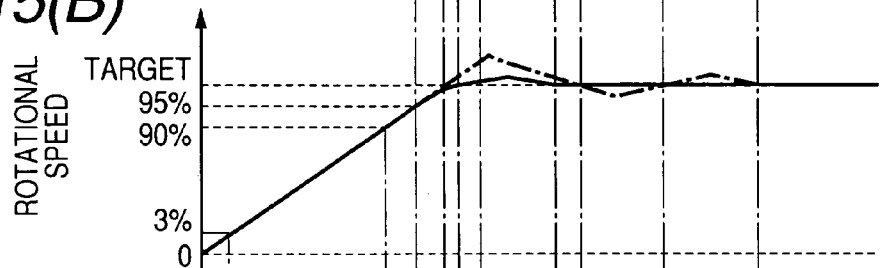
Figure 15C:
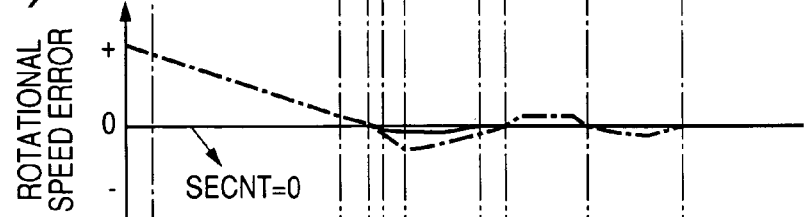
Figure 15D:
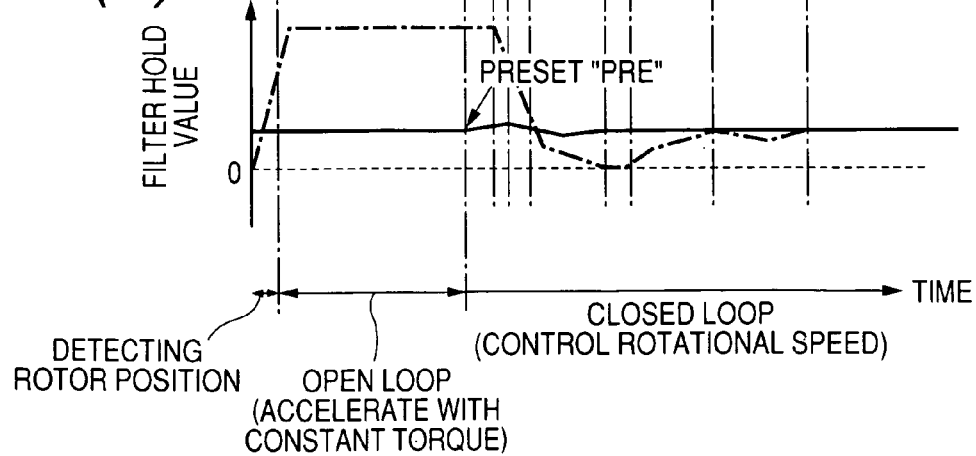

As clearly seen from the solid line and the dashed line in FIG. 15(B), showing the rotational speed of the motor, the solid line (this embodiment) shows a lower overshoot compared to the dashed line.

The present invention being thus described in detail based on the preferred embodiments, the invention is not limited to the embodiments, and it should be well understood that various changes and modifications are possible without a departure from the sprit and scope of the invention. For example, the drive control circuit in the above embodiments adopts the so-called sensor less system that detects the stationary position of the rotor by detecting the back electromotive forces to thereby determine the energizing starting phase. However, it is possible to adopt a construction that detects the stationary position of the rotor by using hall sensors and the like. And, the motor may be a multi-phase motor instead of the three-phase motor.

Further in the above embodiments, the speed control loop is switched from the open loop into the closed loop when the rotational speed of the motor reaches 95% of the target. However, 95% is only one example, and the switching point may be about 90 to 96%. Further in the above embodiments, the phase control by the PLL is started when the rotational speed of the motor exceeds 90% of the target, and the speed control loop is switched from the open loop into the closed loop when the rotational speed of the motor exceeds 95% of the target. However, it is possible to construct the system so as to perform the speed control by the speed control loop and the phase control by the PLL at the same time, or to perform the switching of the speed control loop in prior to the phase control by the PLL.

Further in the above embodiments, the speed information fed back to the speed control circuit (41 to 44) is taken out from the output of the loop filter 23 on the PLL. However, the speed information may be taken out from the other parts of the circuit. Alternatively, another counter that counts the signal on the PLL may be provided separately to supply the speed control circuit with the counter value as the speed information. However, the increase of the circuit scale can be restricted by taking out the speed information from the output of the loop filter 23 on the PLL, as in the embodiments.

When the speed information NCNT outputted from the filter 23 contains information less than the decimal point in regard to the sampling frequency and the oscillator 24 operates at the sampling frequency, the oscillator generates quantization errors; accordingly, if the speed information is taken out from the subsequent stage to the oscillator 24, it will deteriorate the accuracy of the speed control. In the embodiments, the speed information NCNT outputted from the filter 23 is fed back to the speed control circuit (41 to 44), and a highly accurate speed control can be performed.

Further, the embodiments will realize a drive control device of a DC multi-phase brushless motor, whereby the burden on the microprocessor is relieved and the irregularities of rotation of the motor is reduced. The embodiments will also realize a recording device for a magnetic recording disk, which suppresses the irregularities of rotation of the spindle motor to rotate the magnetic recording disk, and enables down-sizing and high-density recording.

Further, the embodiments will realize a drive control device of a DC multi-phase brushless motor that can shorten a time within which the motor reaches a steady rotation without increasing the burden on the microprocessor.

The above embodiments have been described with the case, in which this invention is applied to a drive control device of the motor for a hard disk drive, being the applicable field of this invention. However, the invention is not confined to this, and it can be widely applied to a drive control device of a brushless motor, such as a motor to rotate disks for a MO drive, DVD drive, and CD drive, and a motor to rotate a polygon mirror for a laser beam printer.

What is claimed is:

1. A drive control device of a motor comprising:
   a current output circuit that sequentially makes a current flow to a coil of each of phases in a brushless motor provided with a plurality of coils;
   a coil voltage detection circuit that detects a voltage across coil terminals of each of the phases of the brushless motor;
   a coil current detection circuit that detects currents flowing through coils of the brushless motor;
   an analog-to-digital converter that converts the voltage across the coil terminals detected by the coil voltage detection circuit and the currents flowing through the coils detected by the coil current detection circuit into digital signals; and
   a control system circuit that controls the current output circuit based on signals detected by the coil voltage detection circuit and the coil current detection circuit,
   the drive control device driving to rotate the motor by sequentially switching the currents flowing through the coils of the brushless motor,
   wherein the control system circuit comprises:
   a phase difference detector that detects phase differences between zero crossing points of back electromotive forces of the coils detected by the coil voltage detection circuit during rotation of the motor, and zero points of the currents outputted from the current output circuit;
   a filter that accumulates the phase differences detected by the phase difference detector;
   an oscillator of which frequencies are controlled according to outputs from the filter; and
   an output current control circuit that drives the current output circuit and generates signals for controlling output currents from the current output circuit,
   wherein output signals from the oscillator are supplied to the output current control circuit as signals that give switching timing of the current flowing through the coil of each of the phases, and signals that give timing of zero crossing points of the output currents are fed back to the phase difference detector from the output current control circuit, to form a phase control loop, and
   wherein a rotational speed comparator is provided which compares a rotational speed extracted from a digital signal which contains information on a rotational speed of the brushless motor and is taken out on the way of the phase control loop with a target rotational speed to thereby detect a rotational speed error, and the output current control circuit controls the rotational speed of the brushless motor based on an output from the rotational speed comparator.

2. A drive control device of a motor according to claim 1, wherein the digital signal is taken out from a signal line between the filter and the output current control circuit.

3. A drive control device of a motor according to claim 2, wherein the digital signal which is taken from a signal line between the filter and the oscillator is not yet quantized.

4. A drive control device of a motor according to claim 1, wherein the rotational speed comparator performs an accumulation processing of the digital signal to extract the rotational speed of the motor, and compares the rotational speed extracted with the target rotational speed.

5. A drive control device of a motor according to claim 4, wherein the rotational speed comparator includes a computing unit composed of delay units and adders, and performs the accumulation processing by making the computing unit accumulate the digital signal by a predetermined number.

6. A drive control device of a motor according to claim 4, wherein the rotational speed comparator performs the accumulation processing of the digital signal within a mechanical angle 360° of the brushless motor to extract the rotational speed of the brushless motor, and compares the rotational speed extracted with the target rotational speed.

7. A drive control device of a motor according to claim 6, wherein when P is a number of magnetic poles of the motor, the rotational speed comparator performs the accumulation processing of the digital signal, calculates an integrated value of the electrical angle 360° within the mechanical angle 360° of the brushless motor by a number corresponding to P/2 to extract the rotational speed of the motor, and compares the rotational speed extracted with the target rotational speed.

8. A drive control device of a motor according to claim 1, wherein the output current control circuit generates PWM signals that control the currents flowing through the coils on the basis of outputs from a current error detection circuit, and supplies the PWM signals to the current output circuit.

9. A drive control device of a motor according to claim 1, further comprising a switching circuit capable of selecting the output from the rotational speed comparator or a speed command value from an outside and supplying the selected one to the output current control circuit.

10. A disk rotation system comprising:
    a drive control device for a brushless motor that sequentially switches current flowing through a coil of each of phases of the brushless motor and thereby drives to rotate the brushless motor;
    the brushless motor driven to rotate by the drive control device; and
    a system control device that supplies a rotational speed command value and an operational mode command to the drive control device,
    wherein the drive control device comprises:
    a current output circuit that sequentially makes a current flow to the coil of each of the phases in a brushless motor provided with a plurality of coils;
    a coil voltage detection circuit that detects a voltage across coil terminals of each of the phases of the brushless motor;
    a coil current detection circuit that detects currents flowing through the coils of the brushless motor;
    an analog-to-digital converter that converts the voltage across the coil terminals detected by the coil voltage detection circuit and the currents flowing through the coils detected by the coil current detection circuit into digital signals; and
    a control system circuit that controls the current output circuit based on signals detected by the coil voltage detection circuit and the coil current detection circuit,
    wherein the control system circuit comprises:
    a phase difference detector that detects phase differences between zero crossing points of back electromotive forces of the coils detected by the coil voltage detection circuit during rotation of the motor, and zero points of the currents outputted from the current output circuit;

a filter that accumulates the phase differences detected by the phase difference detector;

an oscillator of which frequencies are controlled according to outputs from the filter; and an output current control circuit that drives the current output circuit and generates signals for controlling output currents from the current output circuit, wherein output signals from the oscillator are supplied to the output current control circuit as signals that give switching timing of the current flowing through the coil of each of the phases, and signals that give timing of zero crossing points of the output currents are fed back to the phase difference detector from the output current control circuit, to form a phase control loop, and wherein a rotational speed comparator is provided which compares a rotational speed extracted from a digital signal which contains information on a rotational speed of the brushless motor and is taken out by way of the phase control loop with a target rotational speed to thereby detect a rotational speed error, and the output current control circuit controls the rotational speed of the brushless motor based on an output from the rotational speed comparator, and wherein the drive control device selects the rotational speed command value from the system control device until the motor attains a predetermined rotational speed and supplies the selected rotational speed command value to the output current control circuit at a start of rotating a disk, thereby performing a rotation speed control for accelerating the rotational speed by an open loop, and the drive control device selects the output from the rotational speed comparator and supplies the selected rotational speed command value to the output current control circuit after the motor attains the predetermined rotational speed, thereby performing a speed control by a closed loop.

* * * * *